(12) United States Patent
Mitchell et al.

(10) Patent No.: US 12,556,511 B2
(45) Date of Patent: *Feb. 17, 2026

(54) PERSONAL AWARENESS SYSTEM AND METHOD FOR PERSONAL SAFETY AND DIGITAL CONTENT SAFETY OF A USER

(71) Applicants: Jeffrey B. Mitchell, Carmel, IN (US); Schyler W. Manning, Fortville, IN (US)

(72) Inventors: Jeffrey B. Mitchell, Carmel, IN (US); Schyler W. Manning, Fortville, IN (US)

(*) Notice: Subject to any disclaimer, the term of this patent is extended or adjusted under 35 U.S.C. 154(b) by 105 days.

This patent is subject to a terminal disclaimer.

(21) Appl. No.: 18/791,780

(22) Filed: Aug. 1, 2024

(65) Prior Publication Data
US 2024/0396872 A1 Nov. 28, 2024

Related U.S. Application Data

(63) Continuation-in-part of application No. 17/688,941, filed on Mar. 8, 2022, now Pat. No. 12,081,552.

(51) Int. Cl.
*H04L 9/40* (2022.01)

(52) U.S. Cl.
CPC ...... *H04L 63/0245* (2013.01); *H04L 63/1425* (2013.01)

(58) Field of Classification Search
CPC ............ H04L 63/0218; H04L 63/0245; H04L 63/0263; H04L 63/102; H04L 63/20; H04W 12/60; H04W 12/64; H04W 12/65
See application file for complete search history.

(56) References Cited

U.S. PATENT DOCUMENTS

| | | | | |
|---|---|---|---|---|
| 8,806,620 | B2* | 8/2014 | Purcell | H04L 67/04 726/22 |
| 2019/0082044 | A1* | 3/2019 | Melendez | H04W 4/023 |
| 2019/0156191 | A1* | 5/2019 | Cordes | G08B 21/02 |
| 2019/0307328 | A1* | 10/2019 | Tran | A61B 5/002 |
| 2020/0015728 | A1* | 1/2020 | Mena Benito | G16H 50/30 |
| 2022/0172594 | A1* | 6/2022 | Cho | B60Q 5/006 |
| 2023/0402143 | A1* | 12/2023 | Hams | G16H 15/00 |
| 2024/0154977 | A1* | 5/2024 | Moore | H04L 63/166 |
| 2025/0322478 | A1* | 10/2025 | Lee | G16H 80/00 |

\* cited by examiner

*Primary Examiner* — Eric W Shepperd
(74) *Attorney, Agent, or Firm* — H. Brock Kolls

(57) ABSTRACT

The present invention relates to a personal awareness system that provides users physical health/wellness/welfare safety as well as online digital safety by blocking inappropriate digital content. The personal awareness system comprises a network protection appliance for use on a local area network (LAN), a software application that is used on a mobile computing device, a cloud-based remote data processing resource to administer the system, artificial intelligence (AI) information systems, and a monitor computing device that an observer can use to monitor, track, and receive alerts related to the user. The system can support many users individually as well as groups of users. In operation, sensors associated with the mobile computing device monitor the health, wellness, and location of users and digital filter rules suppress inappropriate digital content from user access providing digital safety. The mobile computing device seamlessly transitions between LAN environments and wireless mobile environments.

20 Claims, 19 Drawing Sheets

PERSONAL AWARENESS SYSTEM AND METHOD FOR PERSONAL SAFETY AND DIGITAL CONTENT SAFETY OF A USER

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application is a continuation-in-part application of U.S. non-provisional application Ser. No. 17/688,941, inventor Jeffery B. Mitchell et al., entitled "PERSONAL AWARENESS SYSTEM AND METHOD FOR PERSONAL SAFETY AND DIGITAL CONTENT SAFETY OF A USER", filed Mar. 8, 2022; which claims the benefit of a U.S. provisional application, Ser. No. 63/159,501, inventor Jeffery B. Mitchell et al., entitled "NETWORK PROTECTION APPLIANCE AND METHODS FOR CONTROLLING ACCESS, FILTERING, AND SUPPRESSING OF DIGITAL CONTENT", filed Mar. 11, 2021.

TECHNICAL FIELD OF THE INVENTION

This invention relates to a personal awareness system that provides a user with a combination of physical health/wellness/welfare safety and online digital safety by blocking inappropriate digital content. The personal awareness system comprises a network protection appliance for use on a local area network (LAN), a software application that can be executed on a mobile computing device, a cloud-based remote data processing resource to administer the system, artificial intelligence (AI) information systems, and a monitor computing device that an observer can use to monitor, track, and receive alerts related to the user physical safety and online safety.

BACKGROUND OF THE INVENTION

As technology advances, malicious and inappropriate websites, as well as other questionable children's inappropriate digital content, are increasingly more prevalent and accessible on the Internet. As a result of the increase in digital content, a shortcoming of the prior art is that it is increasingly difficult for parents to be able to understand how to protect their children from undesirable digital content.

Another shortcoming of the prior art is that for every content-blocking digital device that can be purchased to enable parental control, there are videos and online tutorials on how to bypass these devices. Thus prior are systems are not as secure as one thinks.

Another shortcoming is that online safety is just one aspect of protection, physical safety is another. Current systems don't provide kids or other users with a combination of physical safety and digital safety in a manner that parents or other observers can monitor, track, and/or receive alerts when necessary related to their kids or other users' activity.

The present invention addresses these and other shortcomings by providing a personal awareness system and method used for the personal safety and digital content safety of a user. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a personal awareness system used for the personal safety and digital content safety of a user comprising one or more monitor computing devices for use by one or more of an observer. The monitor computing devices comprise a monitor microprocessor, a monitor memory, and a monitor communication interface, the monitor memory and the monitor communication interface are operationally related to the monitor microprocessor.

The personal awareness system further comprises a mobile computing device comprising a device microprocessor, a device memory, one or more sensors, and a device communication interface. The device memory, the sensor, and the device communication interface are operationally related to the device microprocessor. The mobile computing device is used by a user.

The personal awareness system further comprises a network protection appliance comprising an appliance microprocessor, an appliance memory, and one or more appliance communication interfaces. The appliance memory and one or more of the appliance communication interfaces are operationally related to the appliance microprocessor. The network protection appliance is operationally related to a local area network. The monitor computing devices by way of the monitor communication interface. In operation, the network protection appliance by way of the appliance communication interfaces, the mobile computing device by way of the device communication interface, and one or more remote data processing resource data communicate with each other over a global communication network.

The appliance memory is encoded with instructions that when executed by the appliance microprocessor perform the steps of providing the user with digital content safety by receiving, from the remote data processing resources, at the appliance communication interface. A plurality of data intended for one or more destination computing devices is usable by the user or the mobile computing device.

Continuing by querying one or more artificial intelligence (AI) information systems to determine a data block condition. In operation, the AI information system interrogates the plurality of data in view of one or more digital content filtering rules. And, communicating the plurality of data to one or more of the destination computing devices usable by the user or the mobile computing device when the data block condition is false and blocking the plurality of data from reaching one or more of the destination computing devices when the data block condition is true.

The device memory is encoded with instructions that when executed by the device microprocessor perform the steps of providing the user with personal safety by collecting a plurality of sensor data from one or more of the sensors associated with the mobile computing device. And, querying one or more AI information systems to determine an alert notification based, in part, on the plurality of sensor data.

The monitor memory is encoded with instructions that when executed by the monitor microprocessor perform the steps of receiving, at one or more of the monitor computing devices the alert notification. In operation, the personal safety of the user is monitored by the observer by way of one or more of the monitor computing devices.

Continuing by providing the user with digital content safety by transitioning between when the device communication interface has data communication access with the network protection appliance on the local area network, receiving when the data block condition is false, at the mobile computing device, the plurality of data associated from one or more of the appliance communication interface.

Or, when the device communication interface is absent of data communication access with the network protection appliance on the local area network, receiving, in a mobile network environment, the plurality of data intended for the mobile computing device, by way of the device communication interface, from one or more of the remote data processing resource. Then querying one or more AI information systems to determine the data block condition, wherein the one or more AI information systems interrogates the plurality of data in view of one or more of the digital content filtering rules. And, allowing the plurality of data to be operated on by the mobile computing device when the data block condition is false and blocking the plurality of data from being operated on by the mobile computing device when the data block condition is true.

In operation, the personal awareness system protects the personal safety of the user by monitoring mobile computing device sensor activity and protects the online digital safety of the user by filtering digital content accessible to the user using one or more of the digital content filtering rules by way of the network protection appliance in the local area network environment and by way of software encoded and executed on the mobile computing device in the mobile network environment.

Additional shortcomings of the prior art are overcome and additional advantages are provided through the provision of a method of using a personal awareness system for personal safety and digital content safety of a user. The method comprises the steps of providing a user with digital content safety by way of a network protection appliance comprising an appliance microprocessor, an appliance memory, and one or more of an appliance communication interface. The appliance memory and one or more of the appliance communication interfaces are operationally related to the appliance microprocessor. The network protection appliance is operationally related to a local area network, one or more monitor computing devices by way of a monitor communication interface. In operation, the network protection appliance by way of the appliance communication interface, a mobile computing device by way of a device communication interface, and one or more remote data processing resources data communicate with each other over a global communication network.

Continuing the appliance memory is encoded with instructions that when executed by the appliance microprocessor perform the steps of receiving, from one or more of the remote data processing resources, at one or more of the appliance communication interfaces. A plurality of data intended for one or more destination computing devices usable by the user or the mobile computing device. The mobile computing device comprises a device microprocessor, a device memory, one or more sensors, and the device communication interface. The device memory, one or more of the sensors, and the device communication interface are operationally related to the device microprocessor, the mobile computing device used by the user.

Continuing by querying one or more artificial intelligence (AI) information systems to determine a data block condition. In operation, one or more AI information systems interrogate the plurality of data in view of one or more digital content filtering rules. And, communicating the plurality of data to one or more of the destination computing devices usable by the user or the mobile computing device when the data block condition is false and blocking the plurality of data from reaching one or more of the destination computing devices usable by the user or the mobile computing device when the data block condition is true.

Continuing by providing the user with personal safety by way of the device memory being encoded with instructions that when executed by the device microprocessor perform the steps of collecting a plurality of sensor data from one or more sensors associated with the mobile computing device. And, communicating the plurality of sensor data to one or more AI information systems, one or more of the remote data processing resources, or one or more of the monitor computing devices for use by one or more observers. One or more of the monitor computing devices comprises a monitor microprocessor, a monitor memory, and the monitor communication interface. The monitor memory and the monitor communication interface are operationally related to the monitor microprocessor, the monitor memory is encoded with instructions that when executed by the monitor microprocessor perform the step receiving at one or more of the monitor computing devices the alert notification. In operation, the personal safety of the user is monitored by one or more observers by way of one or more of the monitor computing devices.

Continuing by providing the user with digital content safety by transitioning between when the device communication interface has data communication access with the network protection appliance on the local area network. And, receiving when the data block condition is false, at the mobile computing device, the plurality of data associated with one or more of the appliance communication interface Or, when the device communication interface is absent of data communication access with the network protection appliance on the local area network, receiving, in a mobile network environment, the plurality of data intended for the mobile computing device, by way of the device communication interface, from one or more of the one or more of the remote data processing resource. Then, querying one or more AI information systems to determine the data block condition. In operation, one or more AI information systems interrogate the plurality of data in view of one or more of the digital content filtering rules. And, allowing the plurality of data to be operated on by the mobile computing device when the data block condition is false and blocking the plurality of data from being operated on by the mobile computing device when the data block condition is true.

In operation, the personal awareness system protects the personal safety of the user by monitoring mobile computing device sensor activity and protects the online digital safety of the user by filtering digital content accessible to the user using one or more of the digital content filtering rules by way of the network protection appliance in the local area network environment and by way of software encoded and executed on the mobile computing device in the mobile network environment.

Additional shortcomings of the prior art are overcome and additional advantages are provided through the provision of a personal awareness system used for personal safety and digital content safety of a user comprising a mobile computing device comprising a device microprocessor, a device memory, one or more sensor, and a device communication interface. The device memory, one or more of the sensors, and the device communication interface are operationally related to the device microprocessor. The mobile computing device is used by a user.

The personal awareness system further comprises a network protection appliance comprising an appliance microprocessor, an appliance memory, and one or more appliance communication interfaces. The appliance memory and one or more of the appliance communication interfaces are operationally related to the appliance microprocessor. In operation, the network protection appliance is operationally related to a local area network, the network protection appliance by way of one or more appliance communication interfaces. The mobile computing device by way of the device communication interfaces, and one or more remote data processing resources data communicates over a global communication network.

Continuing, the appliance memory is encoded with instructions that when executed by the appliance microprocessor perform the steps of providing the user with digital content safety by receiving, from one or more of the remote data processing resources, at one or more of the appliance communication interface, a plurality of data intended for one or more destination computing devices usable by the user or the mobile computing device. Then, querying one or more artificial intelligence (AI) information systems to determine a data block condition. In operation, one or more AI information systems interrogate the plurality of data in view of one or more digital content filtering rules. And, communicating the plurality of data to one or more of the destination computing devices usable by the user or the mobile computing device when the data block condition is false and blocking the plurality of data from reaching one or more of the destination computing devices usable by the user or the mobile computing device when the data block condition is true.

Continuing, the device memory is encoded with instructions that when executed by the device microprocessor perform the steps of providing the user with personal safety by collecting a plurality of sensor data from one or more of the sensors associated with the mobile computing device. Then, querying one or more AI information systems to determine an alert notification based, in part, on the plurality of sensor data.

Continuing by providing the user with digital content safety by transitioning between when the device communication interface has data communication access with the network protection appliance on the local area network by receiving when the data block condition is false, at the mobile computing device, the plurality of data associated from the one or more of the appliance communication interface.

Or, when the device communication interface is absent data communication access with the network protection appliance on the local area network by receiving, in a mobile network environment, the plurality of data intended for the mobile computing device, by way of the device communication interface, from one or more of the one or more of the remote data processing resource. Then, querying one or more artificial intelligence (AI) information systems to determine a data block condition. In operation, one or more AI information systems interrogate the plurality of data in view of one or more of the digital content filtering rules. And, allowing the plurality of data to be operated on by the mobile computing device when the data block condition is false and blocking the plurality of data from being operated on by the mobile computing device when the data block condition is true.

In operation, the personal awareness system protects the personal safety of the user by monitoring mobile computing device sensor activity and protects the online digital safety of the user by filtering digital content accessible to the user using one or more of the digital content filtering rules by way of the network protection appliance in the local area network environment and by way of software encoded and executed on the mobile computing device in the mobile network environment.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The foregoing and other objects, features, and advantages of the invention are apparent from the following detailed description taken in conjunction with the accompanying drawings in which.

Figure 1:
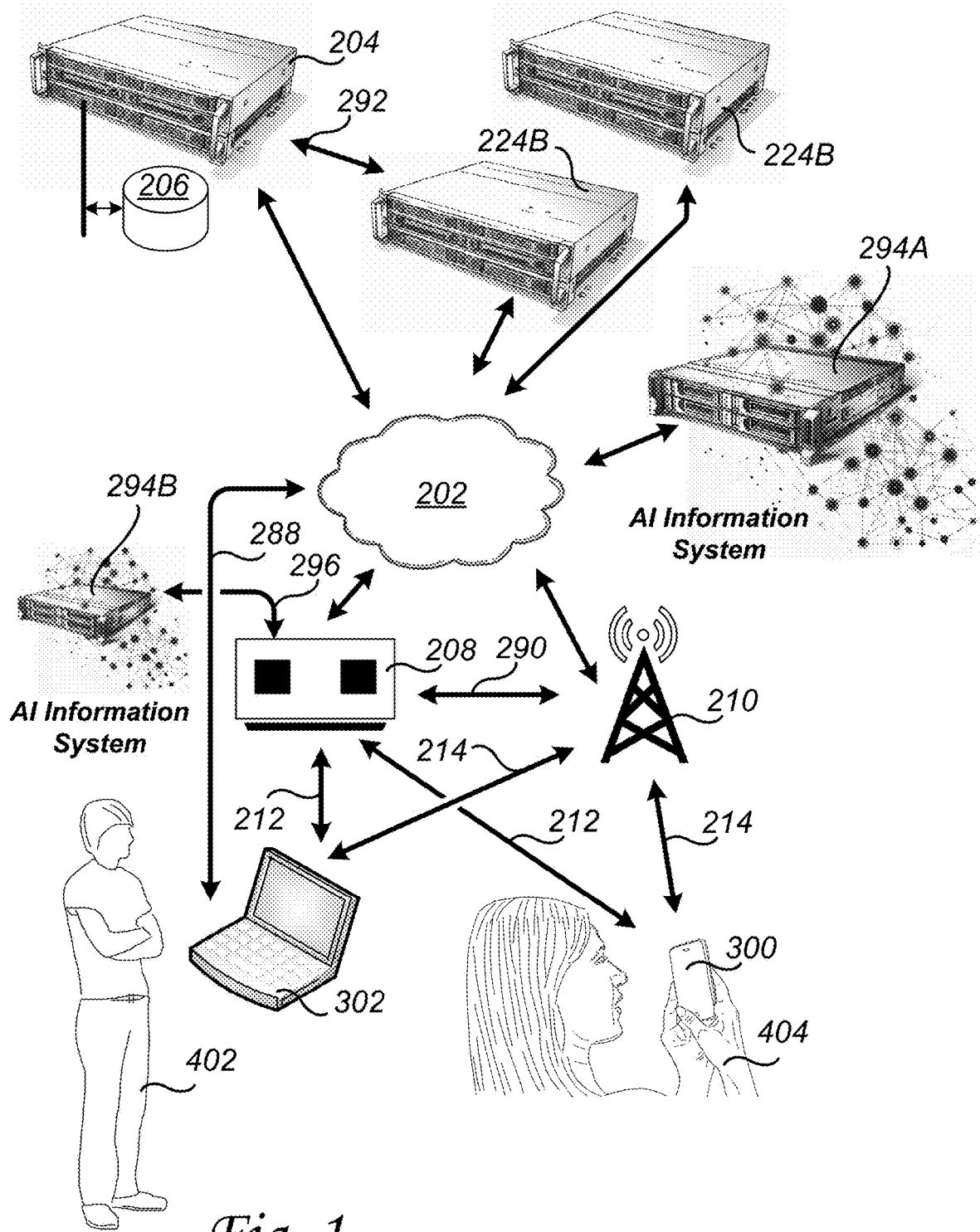
FIGS. 1-3 illustrate examples of a personal awareness system and network configuration.

The detailed description explains the preferred embodiments of the invention, together with advantages and features, by way of example with reference to the drawings.

DETAILED DESCRIPTION OF THE INVENTION

In an exemplary embodiment, the network protection appliance 208 can be configured in a plurality of ways. One such way is as an adult content filter to suppress digital content that could be considered pornography, drugs, violence, or other adult content from reaching your home or business by way of the Internet.

Another way is as a search engine filter to suppress digital content based on keyword searches across major search engines configured for each of the destination computing devices 300 individually on the network or for groups of predetermined destination computing devices 300 on the network. Destination computing devices 300 can be, for example, and not a limitation, a laptop, tablet, smartphone, smartwatch, game console, or other computing devices, as may be required and/or desired in a particular embodiment. Another way is as a security filter to block connections to known malware, viruses, proxies, and virtual private network (VPN) services. Another way is as a privacy filter to stop third-party marketing pixels from tracking a user 402 on the network by way of Internet search history.

In contrast to the prior art, an advantage in the present invention is that configured as a network protection appliance 208 all the devices on the network are automatically protected. This includes all destination computing devices 300 including computers, phones, tablets, video games, watches, fridges, guest devices, and other types and kinds of computing devices on the network.

Another advantage, in the present invention, is that the network protection appliance 100 can be configured to ignore adult content on designated computing devices (such as Mom and Dad) to easily prevent logging or filtering. In effect, allowing adult content on certain computing devices while blocking it on others.

Another advantage, in the present invention, is that no logs are allowed to be collected by global communication network 202 based data processing devices 204, often called cloud devices. In this regard, since all filtering is done on the local network, no search results need to be stored in the cloud. The Internet is one example of a global communication network 202.

Another advantage, in the present invention, is that digital content control, filtering, and suppression features can be easily turned ON/OFF and configured so that parents and business leaders (for disclosure purposes collectively called observers 402) can easily approve access for any computing device on the network from their computing device 300 including their phone or by way of a website locally or remotely, as may be required and/or desired in a particular embodiment.

In the present invention, the term "personal awareness" or "personal awareness system" is intended to mean monitoring and tracking the physical health/wellness/welfare of a user 404 and filtering the digital content the user 404 can access. Awareness is achieved by notifying observers 402 and selectively user 404 (if configured to do so) when necessary so that they can intervene on behalf of the user 404.

In general, in operations, the personal awareness system is a custom computer network, that uses remote data processing resources 204 running proprietary software, using proprietary network protection appliance 208 device hardware and firmware, and integrating with mobile computing devices 300 that are used by the user 404 by running custom software that is installed on the mobile computing device 300. The components of this customized computer network cooperate in a system and method to monitor the physical health/wellness/welfare safety of the user 404 and provide digital safety by blocking inappropriate digital content in local area network (LAN) 212 and mobile communication environments 214. Authorized observers 402 can act as administrators of the system and methods, tailoring parameters and settings to meet the unique needs of user 404. In an exemplary embodiment, the personal awareness system can comprise monitor computing devices 302 used by observers 402 such that the observers 402 by way of the monitor computing devices 302 can monitor, track, and receive alerts and notifications related to the user 404 activity.

In an exemplary embodiment, the personal awareness system provides one or more users 404 physical health/wellness/welfare safety as well as online digital safety by blocking inappropriate digital content. The personal awareness system comprises a network protection appliance 208 for use on a local area network (LAN) 212, a software application that can be executed on a mobile computing device 300, a cloud-based remote data processing resource 204 to administer the system, and a monitor computing device 302 that an observer 402 can use to monitor, track, and receive alerts related to the user 404 activity.

The personal awareness system can support many users 404 individually as well as organize individual users 404 into groups of users so that one or more observers 402 can monitor, track, and otherwise administer individual users 404 or administer a collection of users at the group level. In operation, sensors associated with the mobile computing device 300 monitor the health, wellness, and location of user 404, and digital filter rules suppress inappropriate digital content from user 404 access to provide digital safety. The mobile computing device 300 can seamlessly transition between LAN environments 212 and wireless mobile environments 214.

The term "web-enabled" in the present invention is intended to mean an Internet-of-things device. In this regard, a device that is capable of connecting a physical device such as the mobile computing device 300 via sensors to the digital world. Stated differently, web-enabling is equipping a device with the necessary electronics to be able to monitor, control, and/or data communicate locally and remotely with other data communicating devices. Such other data communicating devices can be smartphones, tablets, laptops, remote data processing resources 204, network protection appliances 208, monitor computing devices 302, and other web-enabled devices, servers, mobile computing devices, and similar devices.

Figure 2:
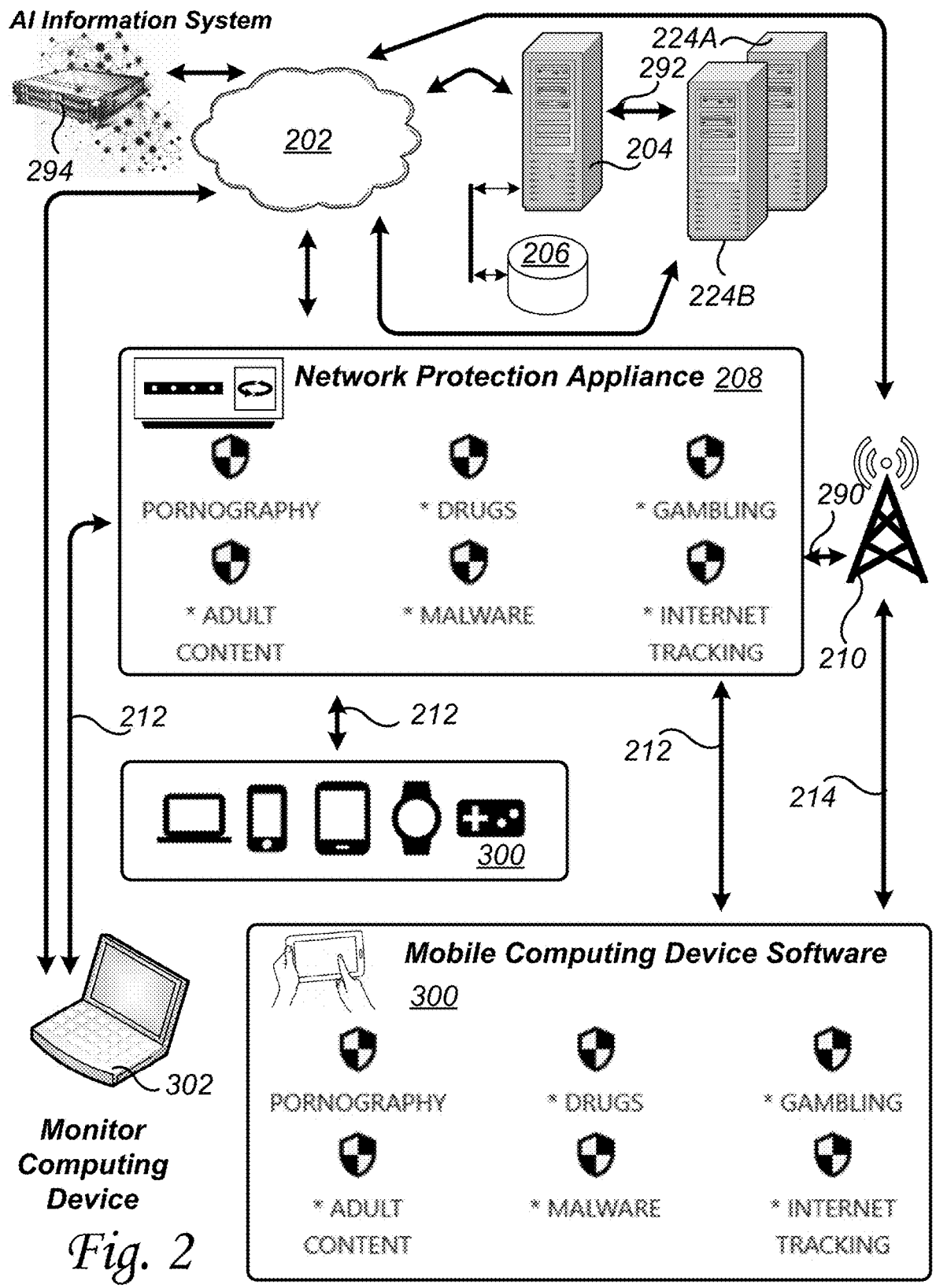
Figure 3:
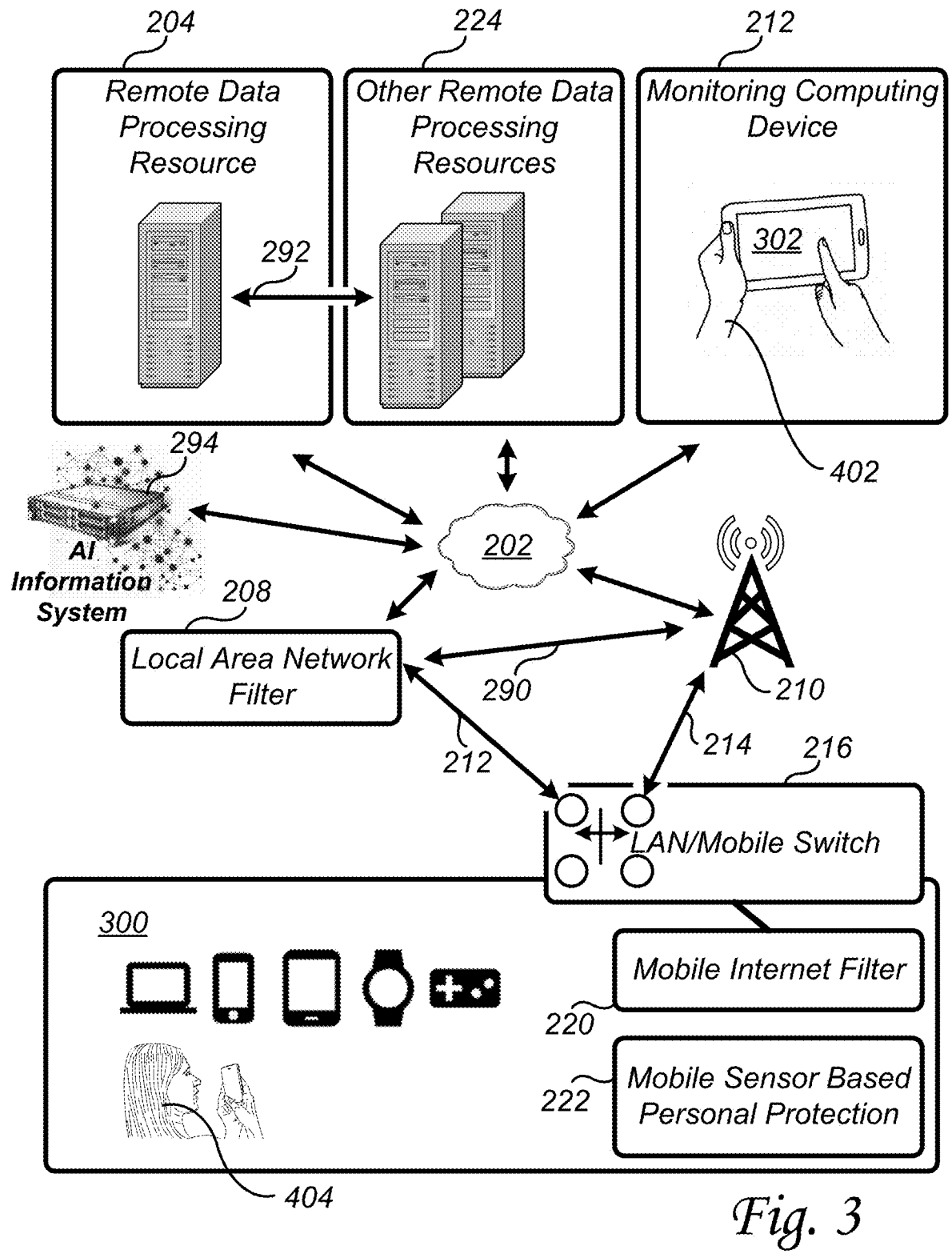

Turning now to the drawings in greater detail, FIGS. 1-3 illustrate examples of a personal awareness system which comprises a network protection appliance 208, at least one mobile computing device 300 configured with a mobile internet filter 220, and mobile sensor-based personal protection 222 software, and a remote data processing resource 204 configured for remote personal awareness system administration 256. In an exemplary embodiment, the network protection appliance 208 provides digital content filtering to all destination computing devices 300 and 302 in a local area network environment (LAN) 212 and in a mobile environment 214 by way of mobile computing software installed on the mobile computing devices 300.

An advantage, in the present invention, is that a rules engine 248 can be set or otherwise programmed on a remote data processing resource 204 administrator 256 or one or more monitor computing devices 302 and then synchronized with the administrator 256. Once synchronized, the centralized updated rules 232 are then data communicated to each of the network protection appliances 208 and mobile computing devices 300 in the system. In this regard, ensuring all of the network protection appliances 208 and mobile computing devices 300 maintain a common set of rules and evaluation software algorithms and other software tools.

Another advantage, in the present invention, is that destination computing devices 300 such as smartphones, tablets, laptops, and other portable computing devices receive digital filtering safety protection from the network protection appliance 208 while connected to the LAN 212 in a wired or wireless manner. Then when the LAN 212 connection is terminated and a mobile environment 214 connection is established mobile digital filtering occurs by way of mobile internet filtering 220 software resident on the mobile computing device 300. In this regard, digital filtering safety and protection is ubiquitous and seamlessly transitions between LAN 212 and mobile connection 214 environments.

Another advantage, in the present invention, is that the sensors that are part of the mobile computing device 300 can be monitored and used to provide personal protection of the user 404. In an exemplary embodiment, a mobile computing device 300 sensors such as the motion, accelerometer, ambient condition sensors, user 404 heart rates, oxygen blood level, electrocardiogram (ECG), biometric, lidar, and other sensors can be monitored and analyzed. In this regard, such monitoring and analysis 252 can happen by way of the remote data processing resource 204 receiving the plurality of sensor data from the mobile computing device 300, or the network protection appliance 208 that is relaying the plurality of sensor data from a mobile computing device 300. When set, notifications and other alerts or alarms can be sent to the mobile computing device 300 and/or monitor computing devices 302.

In the present invention, the term "monitor computing device" and "monitor computing device 302" is intended to mean a computing device such as a laptop, smartphone, tablet, or other suitable computing devices that an observer 402 uses to monitor and receive updated and notification related to one or more of a user 404 whose destination computing devices and/or mobile computing devices are being monitored.

In the present invention, the term "mobile computing device" and "mobile computing device 300" is intended to mean a computing device such as a laptop, smartphone, tablet, or other suitable computing devices that a user 404 can use in a LAN 212 or a mobile environment 214.

In the present invention, the term "destination computing device" and "destination computing device 300" is intended to mean a computing device on a LAN 212 such as a laptop, smartphone, tablet, game console, smartwatch, or other suitable computing devices that a user 404 can use. Typically, as a plurality of data is processed, such plurality of data is associated with an Ethernet media access control (MAC) Address, device Internet protocol (IP) address, or other unique identifiers. In this regard, the destination computing device is the device to which the plurality data is intended to be received from or sent to based on the Ethernet MAC Address, device IP address, or other unique identifiers. A mobile computing device 300 can be referred to as a destination computing device when connected to a LAN 212 environment.

In the present invention, the terms "mobile environment" and "mobile environment 214" are intended to mean when a mobile computing device 300 has established a wireless connection with third-generation (3G), fourth-generation (4G), fifth-generation (5G), or comparable cell tower or network which is depicted in the Figures as tower 210. In this regard, absent a LAN 212 environment connection, the mobile computing device 300 relies on data communication access through the mobile environment 214 connection by way of tower 210. In operation, T-MOBILE, AT&T, VERIZON, and other similar types and kinds of wireless carriers provide a mobile environment 210/214 through which mobile computing devices 300 can data communicate across a global communication network 202. The Internet is one example of a global communication network 202.

Referring to FIG. 1, one example of a personal awareness system and network configuration is illustrated. In an exemplary embodiment, database 206 can be operationally related to remote data processing resource 204. Such a remote data processing resource 204 can be a server or other data processing equipment. The remote data processing resource 204 can be configured to serve as remote data processing administration 256 resources allowing for cloud-based management of the personal awareness system. Such server-based configuration can be hosted on AMAZON WEB SERVICES (AWS), MICROSOFTS AZURE, or other types and kinds of hosted data processing resource platforms as may be required and/or desired in a particular embodiment.

Other remote data processing resources 224A-B can be servers, streaming services, and sources of other digital content such as web servers, email servers, webpages, music, video, pictures, text messages, email, and other digital content sources. For disclosure purposes, such other remote data processing resources 224A-B can be referred to as remote data processing resources 224. Such remote data processing resources 204 and 224 can communicate data over a global communication network 202 such as the Internet.

A network protection appliance 208 is operationally related to the global communication network 202 sending and receiving a plurality of data communications. In operation, an internet service provider can connect to the global communication network 202 and provide data communication connections through cable modems, DSL modems, and other types and kinds of a global communication network 202 connecting data communication equipment, as may be required and/or desired in a particular embodiment. The network protection appliance 208 is operationally related to such data communication equipment by way of one or more of an appliance communication interface 804. Additionally, by way of one or more of an appliance communication interface 804, the network protection appliance 208 can provide a local area network 212 (LAN) connection that enables data communications across the global communication network 202 as well as data communication between a plurality of destination computing devices including mobile computing devices 300 used by user 404 and monitor computing device 302 used by observer 402.

In an exemplary embodiment, the present invention can make use of one or more artificial intelligence (AI) information system 294A-B (referred to as AI information system 294) based inquiries that can include but are not limited to machine learning, deep learning, natural language processing, and other forms of AI inquiries as may be required and/or desired in a particular embodiment. The present invention can communicate query data communications to and with the AI information systems 294. In response, the AI information system 294 can generate and data communicate AI responses that can be parsed and analyzed to provide determination-making, compliance reviews/verification, threat assessments, risk assessments/reviews, generate additional insight, context, and other learnings related to the query information and/or used in other suitable way, as may be required and/or desired in a particular embodiment.

In an exemplary embodiment and with reference to FIG. 1, AI information system 294 can be accessible over a global network 202, illustrated as AI information system 294A or reside and/or have direct data communication access 296 with the network protection appliance 208, illustrated as AI information system 294B. In general, the AI information system 294 can be configured and data communicate with other data communicating resources an devices as required and/or desired in a particular embodiment.

In operation, the AI information system 294 can be one or more AI information systems and each of the AI information systems can be configured to provide different kinds or types of AI response data. As an example, some generative AI systems can be configured for social media and general information types of requests related to natural language processing, some machine learning and/or deep learning AI systems can be configured for legal or regulatory information, content filtering rules, virus or ransomware type detections, internet browsing monitoring, dark web monitoring, financial fraud, human trafficking, drug/illegal/other nefarious activity threats detection, predictive analysis based on sensor and other data/information, or other purposes, and other AI systems can be configured to interact and provide other types and/or kinds of information as may be required and/or desired in a particular embodiment.

In an exemplary embodiment, the mobile computing device 300 can data communicate with global communication network-based data processing resources 204 and 224 in a LAN 212 environment, in a wireless mobile environment 214, and in a combination wireless mobile environment 214 and LAN 212 environment using a virtual private network (VPN) 290 data communication connection between the mobile environment 214 and the LAN environment 212 by way of the network protection appliance 208. Such data communications between the data processing resource 204, the network protection appliance 208, and the mobile computing platform 302 across the global communication network 202 can be unencrypted, encrypted, VPN, tunnel types or kinds of communications, and other types and/or kinds of data communications as may be required and/or desired in a particular embodiment. In addition, when data processing resource 204 and data processing resource 224 are co-located on a LAN type connection a VPN 292 or similar data communication connection between the data processing resources 204/224 can be established.

In a plurality of exemplary embodiments, such appliance communication interfaces 804, communication interfaces 704, device communication interfaces 604, and monitor communication interfaces 504 can be LAN, wide area network (WAN), universal serial bus (USB), virtual private network (VPN), tunneling or similar, unencrypted, encrypted, Ethernet, recommended standard 232 (RS232), recommended standard 485 (RS485), serial, WiFi, 802.11abgn and similar, second-generation (2G), 3G, 4G, or 5G compatible, Bluetooth, transmission control protocol (TCP), user datagram protocol (UDP), Mesh Network, Zigbee, Pico Network, long range navigation (LORAN), and/or other types and kinds of communication interfaces and protocols.

In an exemplary embodiment, a plurality of destination computing devices including a plurality of mobile computing devices 300 can be used by a plurality of users 404. In this regard, an advantage, in the present invention, is that each of the plurality of users 404 can be protected personally and digitally through a customized rules engine 248, filtering 250, monitoring and analysis 252, and logging and alerting 254 configurations that are managed by one or more observers 402.

In the present invention, the term "observer", "observer 402", or "observers" is intended to mean an administrator, parent, guardian, agency, or other person or organization that is accountable for monitoring the well-being and personal safety and digital safety of the user 404.

In an exemplary embodiment, observer 404 can use a monitor computing device 302 that has data communication access to the data processing resource 204 and/or the network protection appliance 208 by way of the LAN 212, mobile environment 214, or other data communication access connection 288 as may be required and/or desired in a particular embodiment.

In the present invention, the term "personal safety" is intended to mean using sensors such as health, microphone/camera, motion, acceleration, location, and other sensors that are part of a mobile computing device 300 to monitor, track, or otherwise deduce the health/wellness/welfare of a user 404 of the mobile computing device 300. In operation, the sensor data and other data can be used to provide notifications to user 404 and observer 402 when the sensor data and other data suggest intervention is warranted to ensure the personal safety of user 404.

In the present invention, the term "digital safety" is intended to mean filtering digital content through the use of rules and other methods to ensure that the user is not exposed to potentially inappropriate digital content. In operation, digital filtering blocks digital content that includes pornography, drug references, gambling, adult content, malware, internet tracking, and other types and kinds of inappropriate digital content to provide digital safety to user 404. Furthermore, when such rule-violating activity is initiated by user 404, logging applications track such activity, and notifications and alerts can be generated to inform observer 402 as well as selectively user 404 (if configured to do so).

Referring to FIG. 2, there is illustrated a personal awareness system. In an exemplary embodiment, a personal awareness system can be used for the personal safety and digital content safety of user 404. The personal awareness system comprises one or more monitor computing devices 302 for use by one or more observers 402. The monitor computing device 302 comprises a monitor microprocessor 502, a monitor memory 510, and a monitor communication interface 504. The monitor memory 510 and the monitor communication interface 504 are operationally related to the monitor microprocessor 502.

A mobile computing device 300 comprises a device microprocessor 602, a device memory 614, one or more of a sensor 608, and a device communication interface 604. The device memory 614, the sensor 608, and the device communication interface 604 is operationally related to the device microprocessor 602. The mobile computing device 300 is used by user 404.

In operation, the software is encoded as an application in the mobile computing device 300 device memory 614. Such software includes digital filtering that blocking of certain digital content including pornography, drug references, gambling, adult content, malware, internet tracking, and other types and kinds of inappropriate digital content to provide digital safety to user 404. Furthermore, when such rule-violating activity is initiated by the user 404, logging applications track such activity, and notifications and alerts can be generated to inform the observer 402 as well as selectively user 404 if configured to do so.

The network protection appliance 208 comprises an appliance microprocessor 802, an appliance memory 806, and one or more appliance communication interface 804. The appliance memory 806, and the appliance communication interface 804 is operationally related to the appliance microprocessor 802. The network protection appliance is operationally related to a local area network 212. The monitor computing device 302 by way of the monitor communication interface 504, the network protection appliance 208 by way of the appliance communication interface 804, the mobile computing device 300 by way of the device communication interface 604, and one or more of a remote data processing resource 204 and/or the AI information system 294 data communicate with each other over a global communication network 202.

In operation, the appliance memory 806 is encoded with instructions that when executed by the appliance microprocessor 802 perform the steps of providing the user 404 with digital content safety by receiving, from the remote data processing resource 204/224, at the appliance communication interface 804, a plurality of data intended for one or more of a destination computing device 300A that is usable by the user 404. The mobile computing device 300 can be included as a destination computing device 300A when the mobile computing device 300 is connected to the LAN 212.

At least one data attribute can be determined by interrogating the plurality of data to deduce type, kind, content, and/or received from location information. In an exemplary embodiment, such interrogation of the plurality of data can deduce what type of data it is such as streaming, pictures, webpage, uniform resource locator (URL), text message, executable file, and others. The interrogation of the plurality of data can also deduce what kind of data it is such as secured, insecure, financial, meta, personal, identity revealing data, and other data. Additionally, the location where the plurality of data originated from can be interrogated to deduce the country of origin, server location, website, network type, VPN data, and other location data. A data block condition can be determined by comparing the data attribute to one or more digital content filtering rules.

In an exemplary embodiment, a digital content filter can be a white list of approved websites, a black list of banned websites, or a list of alarm words that when found in the digital content would prompt suppressing the data communication effectively blocking it. Such alarm words can include a gun, threat, shot, hurt, caution, porn, hate, and many other words. Such other digital content rules can include, for example, and not a limitation, open time of day periods where filtered digital content is viewable as well as closed time of day periods when all digital content is suppressed, and other types and kinds of digital content rules as may be required and/or desired in a particular embodiment. Other types of digital content filter rules can be heuristic 230 in nature using a series of evaluations, questions, or conditions to determine a score or ranking among possible outcomes and then passing or suppressing the data communication based on the determined score or ranking achieving a certain threshold quantitatively and/or qualitatively. Other types of digital content filter rules can be generated using machined learned techniques or through artificial intelligence (AI) 228 derived means. Such digital content rules can be self-generated by the observer 402 or administrator or accessed for use through subscription-based models where the observer 404 or the administrator of the personal awareness system pays a periodic fee for use.

Upon interrogation and determination of a block condition code (true suppress the data or false let the data pass), the plurality of data is blocked from reaching the destination computing device 300A that is usable by the user 404 or the mobile computing device 300 when the data block condition is true. The plurality of data is data communicated to the destination computing device 300A that is usable by user 404 or the mobile computing device 300 when the data block condition is false.

In an exemplary embodiment, the device memory 614 can be encoded with instructions that when executed by the device microprocessor 602 performs the steps of providing the user 404 with personal safety by collecting a plurality of sensor data from one or more of a sensor 608 associated with the mobile computing device 300. The plurality of sensor data is then data communicated to the remote data processing resource 204.

To inform the observer of the health/wellness/welfare of the user 404, the monitor memory 510 can be encoded with instructions that when executed by the monitor microprocessor 502 performs the steps of receiving, from the remote data processing resource 204, at the monitor computing device 302 an alert notification when predetermined one or more of an alarm condition occurs based, in part, on the plurality of sensor data. Wherein the personal safety of the user 404 is monitored by the observer 402 by way of the monitor computing device 302.

In an exemplary embodiment, the plurality of sensor data includes data acquired from sensors 608 and other sensors. Such plurality of data can include data based on an accelerometer reading, data based on a global position system 620 readings, data based on a camera 616 taking pictures or video images, data based on a microphone 622, data based on the user's heart rate readings, data based on the user's echocardiogram (ECG) reading, data based on a panic set of keystrokes entered by the user on a touch screen. The mobile computing device 300 comprises the accelerometer, the global position system 620, the microphone, the heart rate sensor, the blood oxygen level sensor, the echocardiogram sensor, and the touch screen. Furthermore, the accelerometer, the global position system 620, the microphone 622, the heart rate sensor, the blood oxygen level sensor, the echocardiogram sensor, and the touch screen are operationally related to the device microprocessor 602. Sensors 608 includes the motion sensors, accelerometer sensors, ambient condition sensors, user 404 heart rate sensors, user 404 blood oxygen level sensors, user 404 echocardiograms (ECG) sensors, biometric, lidar, and other sensors as may be required, and/or desired in a particular embodiment.

In an exemplary embodiment, the device memory 614 can be encoded with instructions that when executed by the device microprocessor 602 performs the step of receiving, from the remote data processing resource 204, at the mobile computing device 300 the alert notification when a predetermined one or more of the alarm conditions occur based, in part, on the plurality of sensor data, wherein the observer 404 and selectively user 404 (if configured to do so) are notified when personal safety of the user 404 is at risk.

In an exemplary embodiment, such alert notifications can also be referred to as alarm notifications and can be delivered by an email, a text message, activity report, a robocall, other automated warning messages, or contact to the observer 402, selectively user 404 (if configured to do so), law enforcement, medical services, security monitoring service, communication with other authorized persons or organization, or other types and kinds of alert notifications and recipients as may be required and/or desired in a particular embodiment.

In an exemplary embodiment, the user's 404 digital content safety can be provided for by transitioning the LAN/Mobile Switch 216 between 1) when the device communication interface 604 has data communication access with the network protection appliance 208 on the local area network 212 receiving, at the mobile computing device 300, the plurality of data associated with the data pass condition from the appliance communication interface 804; or 2) when the device communication interface is absent data communication access with the network protection appliance 208 on the local area network 212 receiving, in a mobile network environment 214, the plurality of data intended for the mobile computing device 300, by way of the device communication interface 604, from one or more of the remote data processing resources 204/224. At least one of the data attributes is created by interrogating the plurality of data to deduce type, kind, content, or received from location information. Based on the data attribute and the digital content filtering rules the data block condition (true or false) is then determined. The plurality of data is blocked from being operated on by the mobile computing device 300 when the data block condition is true. And, the plurality of data is allowed to be operated on by the mobile computing device 300 when the data block condition is false.

An advantage, in the present invention, and better illustrated in at least FIG. 3, is that the mobile computing device 300 is encoded with a LAN 212/Mobile environment 214 software switch 216. In this regard, when the mobile computing device 300 is connected to a LAN environment the LAN 212/Mobile environment 214 software switch 216 switches 'OFF' the mobile internet filter 220 and instead relies on the network protection appliance 208 to provide this functionality. In the alternative, in the absence of connection to the LAN environment 212, the mobile computing device 300 relies on a mobile environment 214 connection. In this case, the LAN 212/Mobile environment 214 software switch 216 switches 'ON' the mobile internet filter 220 to provide digital safety by applying the digital filtering rules. This is possible because the digital filter rules for user 404 were synchronized with and/or otherwise downloaded from the remote data processing resource 204 on both the network protect appliance 208 and the mobile computing device 300. This feature allows a seamless transition between LAN environment 212 and mobile environments 214 without compromising the digital safety of user 404 and maintaining the ability of observer 404 to monitor and track the user's 404 digital activity.

Another advantage, in the present invention, and better illustrated in at least FIG. 3 is the mobile sensor-based personal protection 222. In this regard, the sensors associated with the mobile computing device 300 can be used to ascertain the health/wellness/welfare of user 404. Such sensor data can be harvested and data communicated to the remote data processing resource 204 or network protection appliance 208 for analysis and evaluation. If such assessment in combination with the predetermined ruleset or criteria for generating an alarm condition is triggered an alarm event and subsequent alert notification is sent to the observer 404, selectively the user 402, and/or other administration or organizations as may be required and or desired in a particular embodiment. As such, the personal awareness system of the present invention provides both personal safety and digital safety for user 404.

In an exemplary embodiment, the personal awareness system protects the personal safety of user 404 by monitoring the mobile computing device 300 sensor activity, sending alert notifications to the observer 402 and selectively the user 404, and filtering digital content accessible to user 404 using one or more of the digital content filtering rule by way of the network protection appliance 208 in the local area network environment 212 and by way of software encoded and executed on the mobile computing device 300 in the mobile network environment 214.

In an exemplary embodiment, the mobile computing device 300 can data communicate with global communication network-based data processing resources 204 and 224 in a LAN 212 environment, in a wireless mobile environment 214, and in a combination wireless mobile environment 214 and LAN 212 environment using a virtual private network (VPN) 290 data communication connection between the mobile environment 214 and the LAN environment 212 by way of the network protection appliance 208. Such data communications between the data processing resource 204 or the AI information system 294, the network protection appliance 208, and the mobile computing platform 302 across the global communication network 202 can be unencrypted, encrypted, VPN, tunnel types or kinds of communications, and other types and/or kinds of data communications as may be required and/or desired in a particular embodiment. In addition, when data processing resource 204 and data processing resources 224 are co-located on a LAN type connection a VPN 292 or similar data communication connection between the data processing resources 204/224 can be established.

In an exemplary embodiment, the monitor memory 510 is encoded with instructions that when executed by the monitor microprocessor 502 performs the step of receiving from the remote data processing resource 204, at one or more of the monitor computing device 300, an alert notification when predetermined one or more of an alarm condition occurs based, in part, on the data attribute. In this regard, a predetermined alarm condition can be set at the remote data processing resource 204, the mobile computing device 300, and/or the network protection appliance 208 such that when upon interrogation of the plurality of data being received at one of these devices from the remote data processing resource 224 triggers one of these alarm condition an alarm notification can be sent to the observer 402 by way of the monitor computing device 302.

Such data attributes that can trigger alarm conditions can include type, kind, content, received from information, or other types and kinds of alarm conditions as may be required and/or desired in a particular embodiment. Type information can include streaming, pictures, web pages, URL, text messages, executable files, and other data types. Kind information can include secured, insecure, financial, meta, personal, identity revealing data, and other data kinds. Content information can include alarm words, for example, and not a limitation, gun, threat, shot, hurt, caution, porn, hate, and many other words. Location can include deducing country of origin, server location, website, network type, VPN data, and other location data. A data attribute on a banned list can trigger an alarm condition.

In an exemplary embodiment, the alert notification can be either an activity report 240, push notification 242, or other type or kind of notification delivered to the observer 402 by way of the monitor computing device 302.

In an exemplary embodiment, the appliance memory 806 and the device memory 614 can be encoded with instructions that when executed by the appliance microprocessor 802 and the device microprocessor 602 each perform the step of downloading one or more of the digital content filtering rules from the remote data processing resource 204.

In an exemplary embodiment, at least one of the digital content filtering rules is a heuristic rule. Additionally, at least one of the digital content filtering rules is a machine-learned or an artificial intelligence generated rule.

Referring to FIG. 3, there is illustrated a personal awareness system. In an exemplary embodiment, where the user 404 and the observer 402 are the same people the use of a separate monitor computing device 302 can be optional. In this regard, a personal awareness system used for personal safety and digital content safety of a user 404 comprises a mobile computing device 300 comprising a device microprocessor 602, a device memory 614, one or more of a sensor 608, and a device communication interface 604. The device memory 614, the sensor 608, and the device communication interface 604 are operationally related to the device microprocessor 602, and the mobile computing device 300 is used by user 404.

In an exemplary embodiment, a network protection appliance 208 comprises an appliance microprocessor 802, an appliance memory 806, and one or more appliance communication interface 804. The appliance memory 806, and the appliance communication interface 804 is operationally related to the appliance microprocessor 802. The network protection appliance 208 is operationally related to a local area network 212.

The network protection appliance 208 by way of the appliance communication interface 804, the mobile computing device 300 by way of the device communication interface 604, and one or more of a remote data processing resource 204/224 data communicate over a global communication network 202.

The appliance memory 806 is encoded with instructions that when executed by the appliance microprocessor 802 perform the steps of providing the user with digital content safety by receiving, from the remote data processing resource 204/224, at the appliance communication interface 804, a plurality of data intended for one or more of a destination computing device 300 that is usable by the user 404 or the mobile computing device 300. At least one data attribute is determined by interrogating the plurality of data to deduce type, kind, content, or received from location information. A data block condition (true or false) is determined by comparing the data attribute to one or more of the digital content filtering rules. The plurality of data is blocked or otherwise suppressed from reaching the destination computing device 300 that is usable by user 404 or the mobile computing device 300 when the data block condition is true. And, the plurality of data is communicated to the destination computing device 300 that is usable by the user or the mobile computing device 300 when the data block condition is false.

In an exemplary embodiment, the device memory 614 can be encoded with instructions that when executed by the device microprocessor 602 performs the steps of providing the user 404 with personal safety by collecting a plurality of sensor data from one or more of a sensor 608 associated with the mobile computing device 300 and communicating the plurality of sensor data to the remote data processing resource 204. An alert notification is received, from the remote data processing resource 204, at the mobile computing device 300 when a predetermined one or more alarm conditions occur based, in part, on the plurality of sensor data.

In an exemplary embodiment, user 404 is provided with digital content safety by transitioning between when the device communication interface 604 has data communication access with the network protection appliance 208 on the local area network 212 receiving when the data block condition is false, at the mobile computing device 300, the plurality of data associated from the appliance communication interface 804. Or, when the device communication interface 604 is absent data communication access with the network protection appliance 208 on the local area network 212 receiving, in a mobile network environment 214, the plurality of data intended for the mobile computing device, by way of the device communication interface, from one or more of the remote data processing resource, At least one of the data attribute is created by interrogating the plurality of data to deduce type, kind, content, or received from location information. Based on the data attribute and the digital content filtering rule the data block condition is determined. The plurality of data is blocked or otherwise suppressed from being operated on by the mobile computing device 300 when the data block condition is true, and the plurality of data is allowed to be operated on by the mobile computing device 300 when the data block condition is false. Wherein the personal awareness system protects the personal safety of user 404 by monitoring the mobile computing device 300 sensor activity and protects the online digital safety of user 404 by filtering digital content accessible to user 404 using the digital content filtering rules by way of the network protection appliance 208 in the local area network environment 212 and by way of software encoded and executed on the mobile computing device 300 in the mobile network environment 214.

Figure 4:
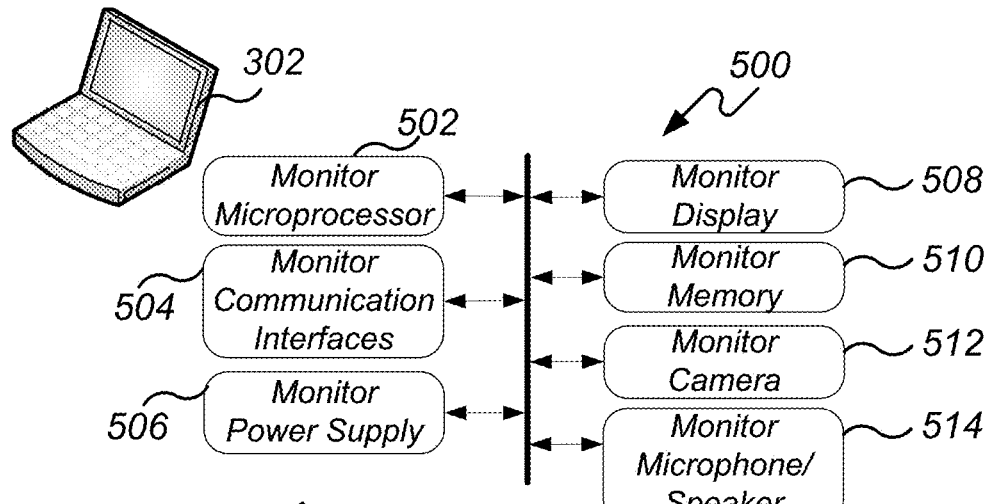
FIG. 4 illustrates one example of a monitor computing device system block diagram.

Referring to FIG. 4, there is illustrated one example of a monitor computing device 302 system block diagram 500. In an exemplary embodiment, the monitor computing device 302 can comprise a monitor microprocessor 502 which is operationally related to a plurality of monitor communication interfaces 504, a monitor power supply 506, a monitor display 508, a monitor memory 510, a monitor camera 512, and a monitor microphone/speaker 514.

The monitor microprocessor 502 can be INTEL, ZILOG, MICROCHIP, AMD, ARM, and/or other types or kinds of microprocessors.

The plurality of monitor communication interfaces 504 can be LAN, WAN, USB, VPN, tunneling or similar, unencrypted, encrypted, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

The monitor power supply 506 can be alternating current (AC), direct current (DC), battery, solar, and/or other types and kinds of power supplies.

The monitor display 508 can be a liquid crystal display (LCD), organic light emitting diode (OLED), light emitting diode (LED), and/or other types and kinds of display.

The monitor memory 510 can be a combination of random access memory (RAM), read only memory (ROM), flash, hard drives, solid-state drives, USB flash drives, and/or other types and kinds of memory.

The monitor camera 512, the monitor microphone, and speaker 514 can be integrated into the monitor computing device 302 enclosure and used to communicate with the user 404 by way of audio and video, or communicate in other ways, as may be required and or desired in a particular embodiment.

In an exemplary embodiment, such monitor computing devices 302 can be laptops, tablets, smartphones, and or types and kinds of monitor computing devices as may be required and/or desired in a particular embodiment.

Figure 5:
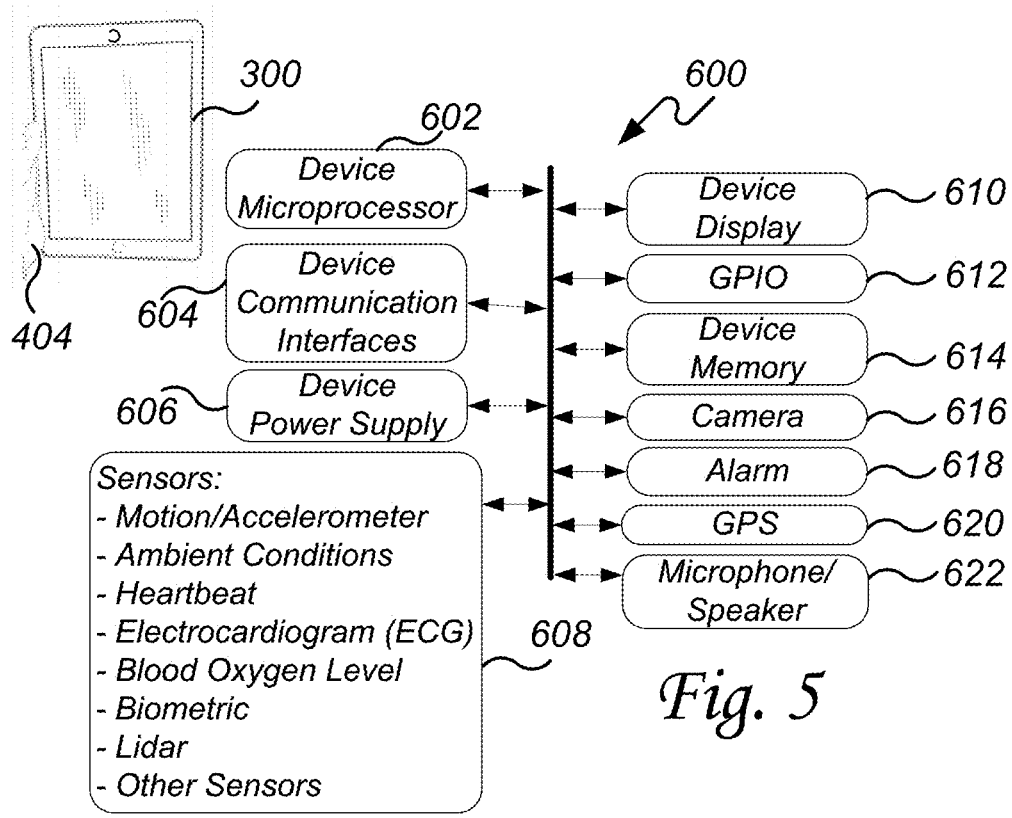
FIG. 5 illustrates one example of a mobile computing device system block diagram.

Referring to FIG. 5, there is illustrated one example of a mobile computing device 300 system block diagram 600. In an exemplary embodiment, the mobile computing device 300 can be equipped with a web-enabled control system 600. Such a web-enabled control system can comprise a device microprocessor 602 that is operationally related to a plurality of device communication interfaces 604, a device power supply 606, a plurality of sensors 608, a device display 610, general-purpose inputs and outputs (GPIO) interface 612, device memory 614, a camera 616, an alarm 618, a global position system device 620, and microphone/speaker 622.

The device microprocessor 602 can be INTEL, ZILOG, MICROCHIP, AMD, ARM, and/or other types or kinds of microprocessors.

The device communication interfaces 604 can be LAN, WAN, USB, VPN, tunneling or similar, unencrypted, encrypted, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

The power supply device 606 can be AC, DC, battery, solar, and/or other types and kinds of power supplies.

The sensors 608 can be motion, velocity, accelerometer, ambient condition sensors (humidity, temperature, other), heart rate, blood oxygen level, electrocardiogram (ECG), biometric, lidar, PIR and other types of motion sensors, infrared, thermal, Doppler radar, ultrasonic, capacitance, touch-type, optical, Hall effect, switch, fingerprint, and other types of biometric sensors, and/or other types and kinds of sensors.

The device display 610 can be an LCD, OLED, LED, and/or other types and kinds of displays.

The general-purpose inputs and outputs (GPIO) 612 can be transistor-to-transistor logic (TTL), complementary metal oxide semiconductor (CMOS), transistors, buffers, relays, pushbutton, switch, and/or other types and kinds of GPIO circuits.

The device memory 614 can be combinations of RAM, ROM, flash, hard drives, solid-state drives, USB flash drives, and/or other types and kinds of memory.

The device camera 616, and the microphone and speaker 622 can be integrated into the mobile computing device 300 enclosure and used to communicate with the observer 402 by way of audio, video, or communicate in other ways, as may be required and/or desired in a particular embodiment.

The alarm 618 can be noise lights, relays, sirens, horns, piezo buzzers, speakers, voice annunciations, and/or other types and kinds of alarms.

The global position system (GPS) device 620 can be used to determine the geographic location of the mobile computing device 300.

The monitor camera 622, the monitor microphone, and speaker 514 can be integrated into the monitor computing device 302 enclosure and used to communicate with the use view audio and video, or communicate in other ways, as may be required and or desired in a particular embodiment.

In an exemplary embodiment, such mobile computing devices 302 can be laptops, tablets, smartphones, and or types and kinds of monitor computing devices as may be required and/or desired in a particular embodiment.

In an exemplary embodiment, a mobile application can be installed on the mobile computing device 300 to block or track digital content. Such applications can be used to protect children, track sex offenders or criminals, intervene to abate alcohol/gambling addicts, and for other people and purposes, as may be required and/or desired in a particular embodiment. In an exemplary embodiment, such mobile applications can be configured to take a screenshot every couple of seconds to be reviewed at the observer's 402 discretion when the mobile computing device 300 is not connected to the network 212/214. Additionally, the mobile application can monitor for VPNs, messaging, or any other application that may be downloaded to help bypass monitoring.

Figure 6:
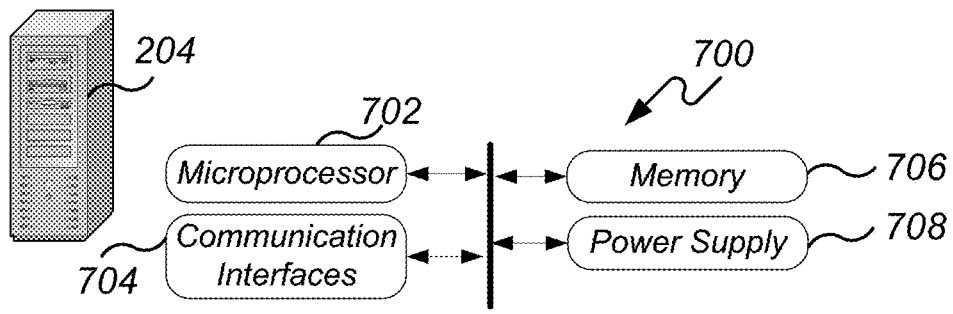
FIG. 6 illustrates one example of a remote data process resource system block diagram.

Referring to FIG. 6, there is illustrated one example of a remote data process resource 204 system block diagram 700. In an exemplary embodiment, the remote data processing resource 204 can comprise a microprocessor 702 which is operationally related to a plurality of communication interfaces 704, a memory 706, and a power supply 708.

The microprocessor 702 can be INTEL, ZILOG, MICROCHIP, AMD, ARM, and/or other types or kinds of microprocessors.

The plurality of communication interfaces 704 can be LAN, WAN, USB, VPN, tunneling or similar, unencrypted, encrypted, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

The memory 706 can be combinations of RAM, ROM, flash, hard drives, solid-state drives, USB flash drives, and/or other types and kinds of memory.

The power supply 708 can be AC, DC, battery, solar, and/or other types and kinds of power supplies.

In an exemplary embodiment, such remote data processing resource 204 can be a server or other types and kinds of data processing equipment as may be required and/or desired in a particular embodiment.

In an exemplary embodiment, the remote data processing resource 224 can be configured with a web-based application that can be used by the observer 402 or other administrators, or business leaders, such as, for example, and not a limitation, at a business. The web-based application can be configured to check the health of the network protection appliance 208 and/or other computing devices 300 on the LAN network 212, and wireless mobile network environment 214. The web-based application can also update the blocked lists of IP addresses, and reboot the network protection appliance 208 and/or the destination computing devices 300 and/or mobile computing devices 300 on the LAN network 212 or the mobile network environment 214. Furthermore, the web-based application can update the network protection appliance 208 and/or destination computing device and/or the mobile computing device 300 on the LAN network 212 or the mobile network environment 214, see usage and any expected logging or reporting, or for other purposes, as may be required and/or desired in a particular embodiment.

Figure 7:
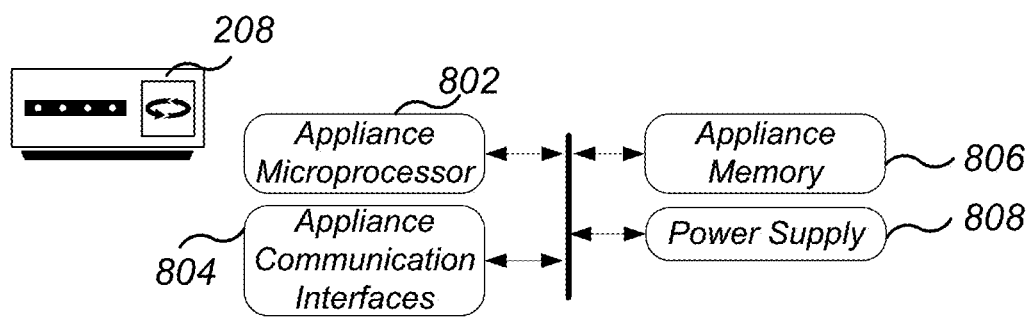
FIG. 7 illustrates one example of a network protection appliance system block diagram.

Referring to FIG. 7, there is illustrated one example of a system block diagram of a network protection appliance 208. In an exemplary embodiment, network protection appliance 208 can comprise an appliance microprocessor 802 which is operationally related to a plurality of appliance communication interfaces 804, an appliance memory 806, and an appliance power supply 808.

The appliance microprocessor 802 can be INTEL, ZILOG, MICROCHIP, AMD, ARM, and/or other types or kinds of microprocessors.

The plurality of appliance communication interfaces 804 can be LAN, WAN, USB, VPN, tunneling or similar, unencrypted, encrypted, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

The appliance memory 806 can be a combination of RAM, ROM, flash, hard drives, solid-state drives, USB flash drives, and/or other types and kinds of memory.

The appliance power supply 808 can be AC, DC, battery, solar, and/or other types and kinds of power supplies.

In an exemplary embodiment, a network protection appliance 208 can be implemented with a computing module. Such computing module can be a Raspberry PI running Raspberry Pi (RPi) or other type or kind of computing modules, as may be required and/or desired in a particular embodiment. Encoded instructions in the appliance memory 806 that when executed by the appliance microprocessor 806 can act as a firewall to block data communication traffic that includes digital content from unwanted websites. A list of websites to be blocked is configurable and is initially, for example, and not a limitation made up of every known adult site that has been discovered.

An advantage of using the network protection appliance 208 in conjunction with mobile and/or web applications is that it helps families and businesses protect their children/patrons/guests and others from unwanted digital content while on their local networks which are connected by way of the network protection appliance 100 to a global communication network 202.

In an exemplary embodiment, the network protection appliance 208 can filter any unwanted traffic by Internet protocol (IP) address. As an example, protects all household devices without any software installed on devices in LAN environment 212 such as Xbox, PlayStation, friend's devices, and family visiting devices. Additionally, network protection appliance 208 can detect and block smart devices from listening in (such as Alexa, Google Home, and others), block advertising and tracking pixels, and detect and alert on possible virtual private network (VPN) tunneling. In this regard, VPN services and VPN data that are intentionally designed to make identifying a user's data communication traffic difficult to identify can be identified. Furthermore, there are lots of types of VPNs that each take a slightly different approach. However, the network protection appliance 208 of the present invention can detect these types of VPNs by creating heuristic rules from known patterns and then using a combination of stateful (shallow) packet inspection and deep packet inspection to assign a confidence level to the actions of a local IP address. If a combination of various rules meets the needed threshold score, the user's 404 parents/observer 402 or business leadership is notified of a potential private tunnel on the home or business network. Furthermore, the network protection appliance 208 can encrypt up to 100% of the data communication traffic going to a single IP address, use a database accessible locally in appliance memory 806 or remotely, such as database 206, of identified known VPN services, and enumerate multiple IP addresses via Internet control message protocol (ICMP), followed by ongoing encrypted traffic to one of the addresses.

In an exemplary embodiment, another product service or feature can include using machine-learning to alert on possible by-passing by way of VPN tunneling or other similar methods. Since issues tend to be regional, another product service or feature can be using the Internet-of-things (IoT) concept to distribute data communications of new sites and vulnerabilities to distribute and update the list or dataset locally as well as nationally and globally, as may be required and/or desired in a particular embodiment. In this regard, it makes it easy to initiate product launches into new countries as the blocked list and majority of features are not language-dependent.

Figure 8:
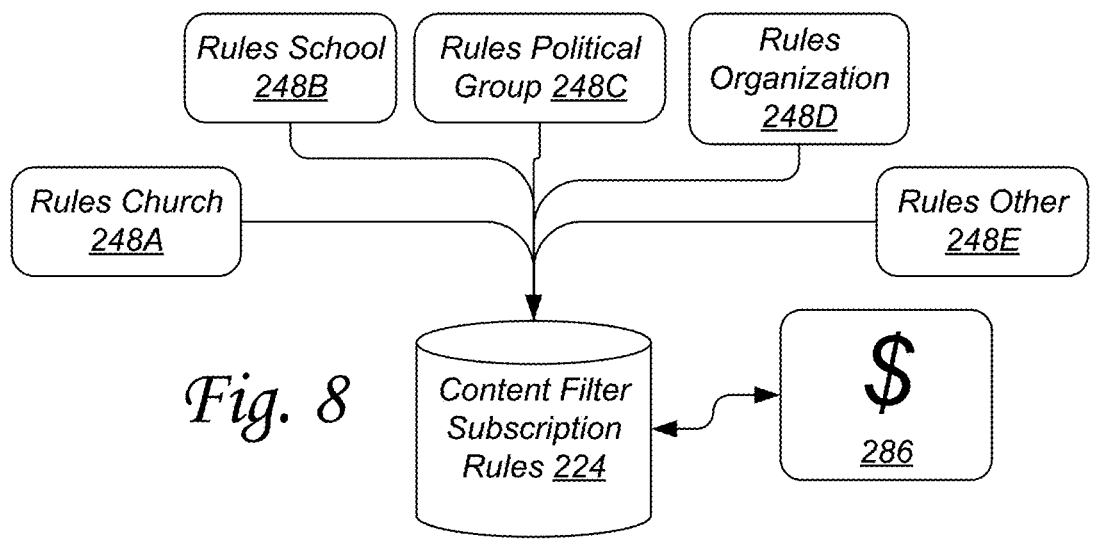
FIG. 8 illustrates one example of subscribing to digital content filter rules.

Referring to FIG. 8, there is illustrated one example of subscribing to digital content filter rules. In an exemplary embodiment, different organizations and other entities will develop their digital filter rule sets. Once developed they can be licensed for use on other personal awareness systems through a subscription model. In this regard, for example, a church can develop a church digital filter ruleset 248A, a school can develop a school digital filter ruleset 248B, a political group can develop a political group digital filter ruleset 248C, an organization can develop an organization digital filter ruleset 248D, and other types and kinds of entities can develop other digital filter ruleset 248E.

Once developed the entities can decide if they want to offer their digital filter ruleset to others who can have it downloaded to their network protection appliances 208 and mobile devices 300. Such a model for allowing digital filter rulesets to be shared can be through a subscription model where one entity licenses under desired monetization terms and conditions their digital filter ruleset for use by another entity.

Such subscription models can be paid 286 for a fixed period of time such as weekly, monthly, or other types and kinds of terms as may be required and/or desired in a particular embodiment.

In an exemplary embodiment, the appliance memory 806 and the device memory 614 are encoded with instructions that when executed by the appliance microprocessor 802 and the device microprocessor 602 each perform the steps of verifying a subscription fee has been paid for use of at least some of the digital content filtering rule, and downloading, upon payment verification, one or more of the digital content filtering rules from the data processing resource 204.

Figure 9:
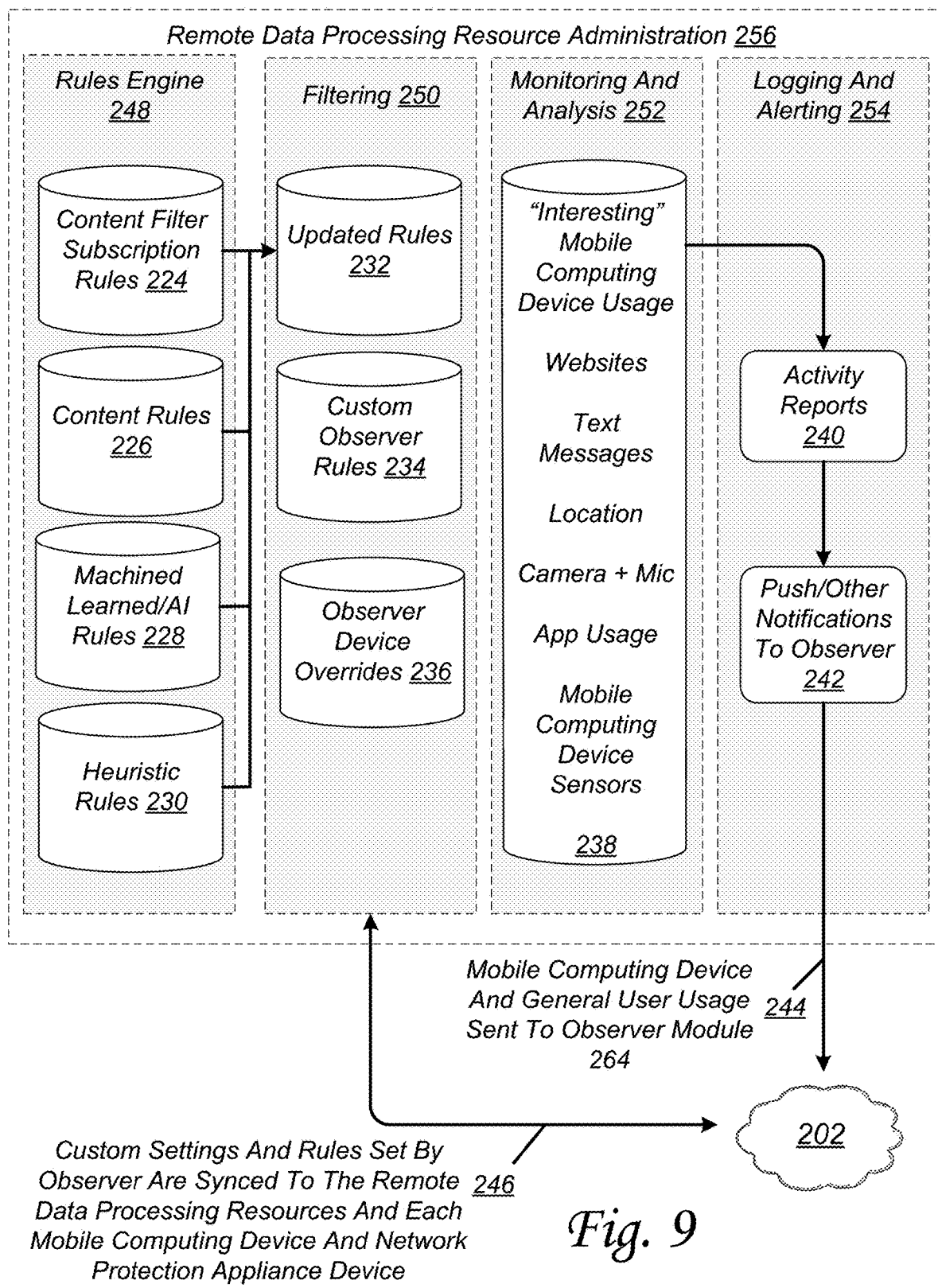
FIG. 9 illustrates one example of administration and configuration of the personal awareness system at a remote data processing resource.

Referring to FIG. 9, there is illustrated one example of the administration and configuration of the personal awareness system at a remote data processing resource 204. In an exemplary embodiment, and informing on how the present invention operates, a remote data processing resource administration 256 structure can be implemented on one or more remote data processing resources 204. In this regard, the framework shown in at least FIG. 9 illustrates the software modules, structure, interoperability, and operation of the central administrative portion of the present invention operating at one or more of the remote data processing resources 204.

In this regard, a rules engine 248 can comprise the digital filter ruleset as well as rules to be applied when evaluating the plurality of sensor data received by the mobile computing device 300. The rules engine 248 series of modules comprises a content filter subscription rules 224 modules, content rules 226 modules, machine-learned or artificial intelligence generated rules 228 modules, and heuristic rules 230 modules. Such rules can be generated and/or stored locally on the remote data processing resource 204, in database 206, wherein the database is operationally related to the remote data processing resource 204, or in other locations that have data communication access with the remote data processing resource 204.

The rules engine 248 modules are aggregated together and stored in an updated rules 232 module which is part of a series of filtering rules 250 modules. The filtering rules module 250 comprises the updated rules 232 modules, the custom observer rules 234 modules, and the observer device overrides 236 modules. The updated rules 232 modules are the aggregate of the content filter subscription rules 224 modules, content rules 226 modules, machine-learned and artificial intelligence generated rules 228 modules, and heuristic rules 230 modules.

In an exemplary embodiment, for example, and not a limitation, the content filter subscription rules 224 are rules that are acquired by way of subscription models from other entities such as church rules 248A, school rules 248B, political group rules 248C, organization rules 248D, and other rules 248E. During the valid period of a subscription, these third-party rules are downloaded or otherwise included in the broader updated rules 232 modules that get distributed to one or more network protection appliance 208 and one or more mobile computing devices 300 that are part of the personal awareness system.

Content rules 226 are rules focused on allowing or suppressing (or otherwise blocking) digital content. Such rules can be directed to evaluating webpages, uniform resource locators (URLs), hyperlinks, websites, text messages, images, and other types and kinds of digital content as may be required and/or desired in a particular embodiment.

The machine-learned and artificial intelligence generated rules 228 are those that are created by way of scanning a large amount of digital content and developing data insights that can be formed into digital content filter rules. Such a large amount of digital content can be generated by usage of the present invention over time as well as bots that crawl the internet, websites, and data repositories and scan what they find.

The heuristic rules 230 use a series of evaluations, questions, and/or conditions to determine a score and/or ranking quantitatively or qualitatively among possible outcomes and then pass or suppress the digital content based on the determined score or ranking.

Within the filtering rules module 250, there is a custom observer rules 234 modules. This module allows the observer 404 or other administrators to create their own filtering rules. Such rules can include digital content rules as well as sensor-based data rules to aid in filtering the plurality of sensor data received from the mobile computing device's 300 sensors.

The filtering rules 250 modules also include the observer device overrides 236. These are a series of settings, parameters, and rules that the observer can enable that allow certain digital content to be suppressed that would otherwise be passed and vice versa passing certain digital content that would otherwise be suppressed.

In operation, noted as 246, the custom settings and rules set by the observer are synchronized over the global communication network 202 to the remote data processing resource 204 and each mobile computing device 300 and network protection appliance device 208.

The monitoring and analysis 252 series of data processing modules 238 that process the plurality of data received, analyze the data to determine the types, kinds, content, and received from/sent to locations to make decisions on the user's 404 personal safety concerns and digital content filtering concerns in view of the predetermined settings, parameters, and rules. The activity is deduced, organized, stored, and included on activity reports 240 that when necessary can be sent to the observer 402 by way of push notifications 242 or other methods as may be required and/or desired in a particular embodiment.

Such data processing modules 238 comprises data processing and analysis modules and techniques for insight generation around interesting mobile computing device 300 usage data, website visitation, history, sent and received text messages, GPS and network learned location data, camera and microphone audio and video data, application usage on the mobile computing device 300, collected mobile computing device 300 sensor data, and other modules to data process other types and kinds of data as may be required and/or desired in a particular embodiment.

A series of logging and alert modules 254 comprises activity reports 240 modules, and push and other types and kinds of notification generator 242. The activity report 240 modules receive and store, from the monitoring and analysis 252 modules, the analyzed data summary in the activity report type formats. The activity report 240 modules log the activity and prepare alert messages, usage reports, and other types and kinds of organized activity information as may be required and or desired in a particular embodiment. The activity reports can vary in types and kinds as may be required and/or desired in a particular embodiment.

The push and other types and kinds of notification generator 242 send messages and reports 244 generated by the activity reports 240 modules to the observer 402 and other designated administrators. Such messages and reports can be sent by way of text messages, emails, robocalls, or other types and or kinds of methods as may be required and/or desired in a particular embodiment.

Figure 10:
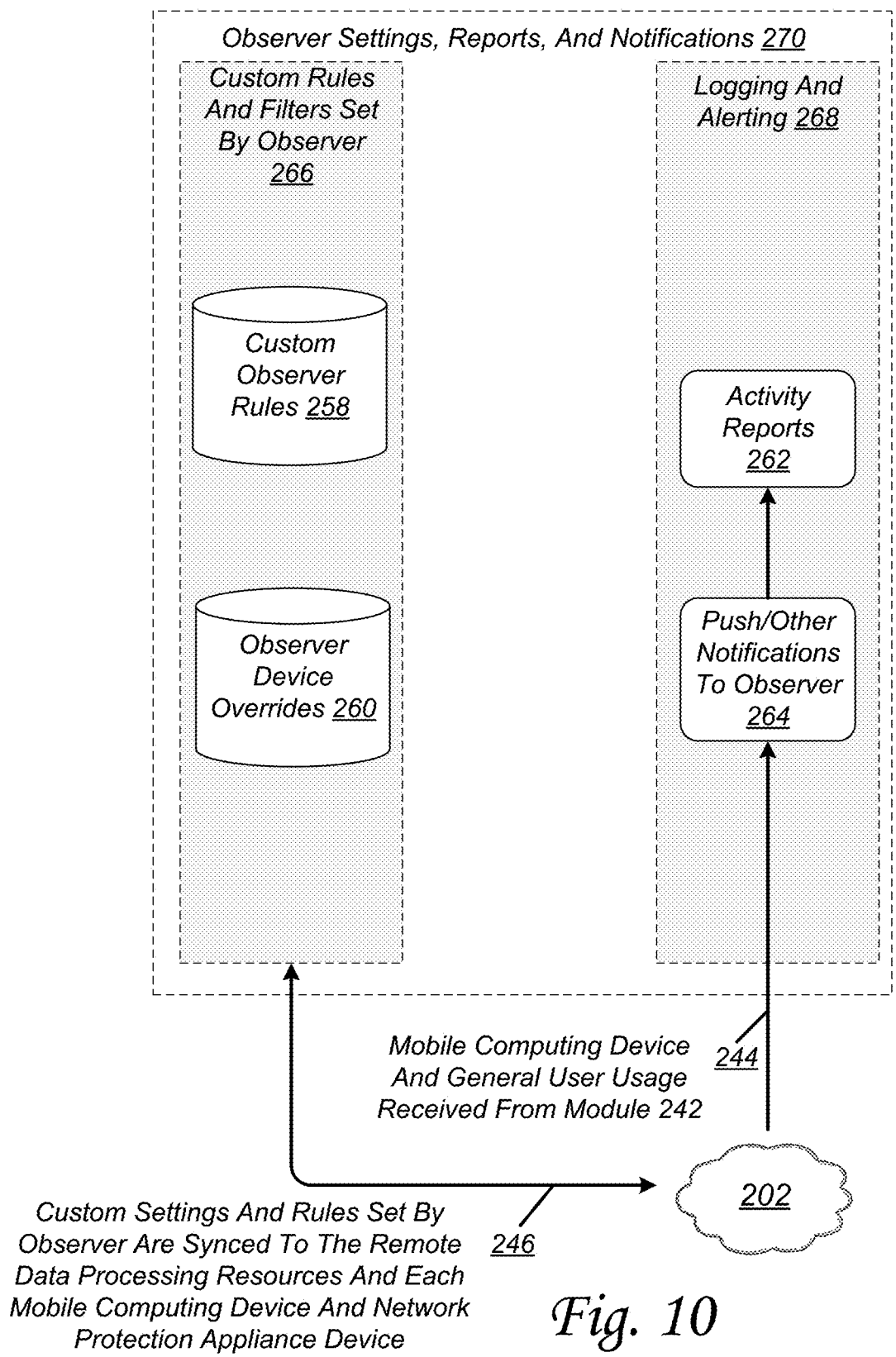
FIG. 10 illustrates one example of administration and configuration of the personal awareness system observer settings, reports, and notifications.

Referring to FIG. 10, there is illustrated one example of the administration and configuration of the personal awareness system observer settings, reports, and notifications 270. In an exemplary embodiment, the custom rules and filters 266 module comprises custom observer rules 258 modules, and the observer device overrides 260 modules. In operation, observer 402 can create custom rules and override settings and conditions and then have those rules, settings, and conditions synchronized to the remote data processing resource 204 custom observer rules 234, and observer device overrides 236 modules. From the remote data processing resource 204 those settings, rules, and conditions can be compiled and synchronized to each of the mobile devices 300 and network protection devices 208 that are part of the personal awareness system.

Within the custom rules and filters set by the observer 266 module, there is a custom observer rules 258 modules. This module allows the observer 404 or other administrators to create their own filtering rules. Such rules can include digital content rules as well as sensor-based data rules to aid in filtering the plurality of sensor data received from the mobile computing device's 300 sensors.

The custom rules and filters set by the observer 266 modules also include the observer device overrides 260. These are a series of settings, parameters, and rules that the observer can enable that allow certain digital content to be suppressed that would otherwise be passed and vice versa passing certain digital content that would otherwise be suppressed.

The observer settings, reports, and notifications 270 also include logging and alerting 268 modules. The logging and alerting modules comprise an activity report 262 modules and a push and other notifications to observer 264 modules. In operation, the push and other notifications to observer 264 modules receive messages and notifications sent from the remote data processing resource push and other notifications to observer 242 modules. The received messages are then stored in the activity reports 262 module where it is accessible by observer 402 and other designated administrators.

Figure 11:
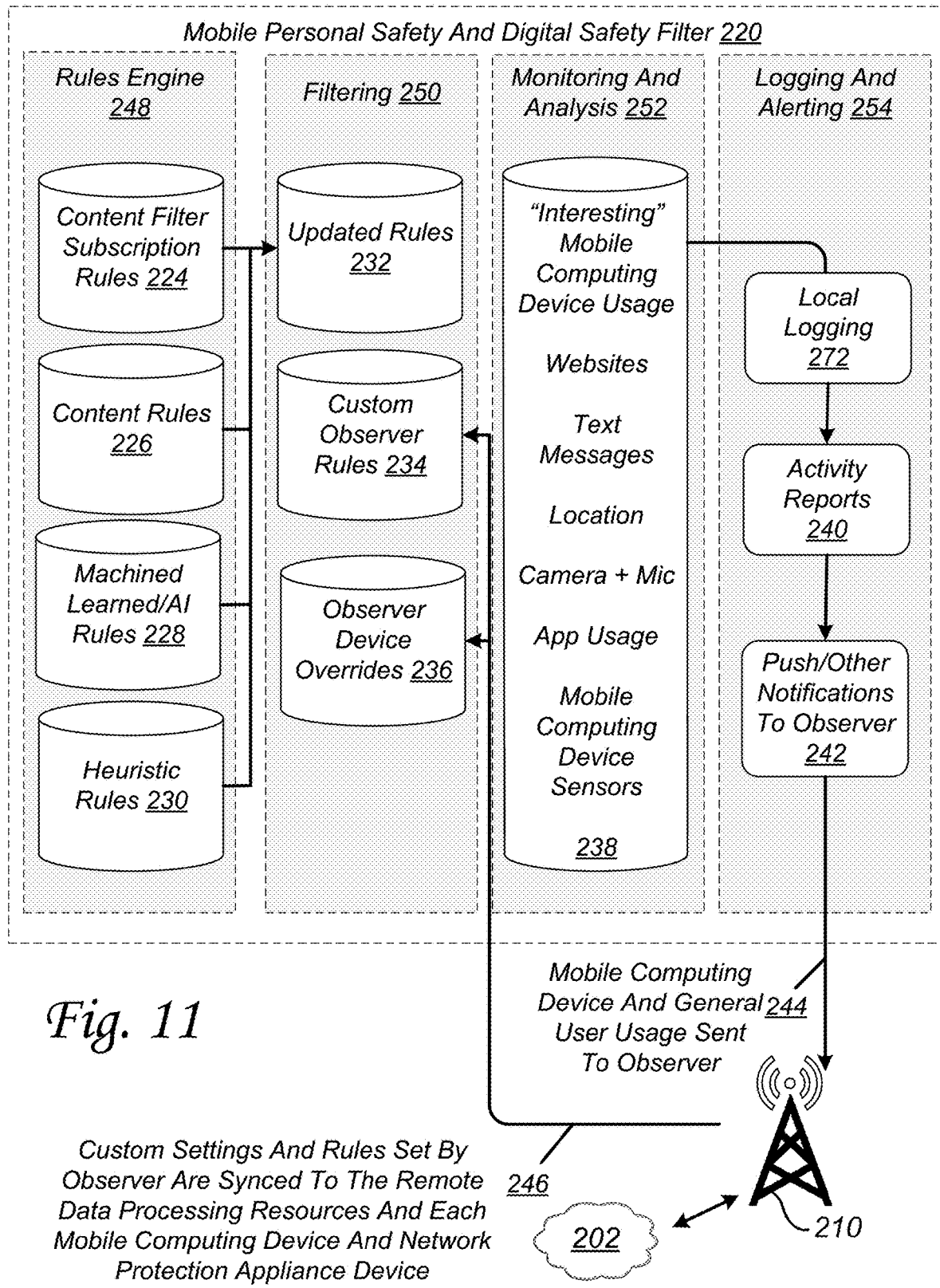
FIG. 11 illustrates one example of administration and configuration of the mobile personal safety and digital safety filter.

Referring to FIG. 11, one example of the administration and configuration of the mobile personal safety and digital safety filter 220. The administration and configuration of the mobile personal safety and digital safety filter 220 can also be referred to as the mobile internet filter 220. The administration and configuration of the mobile personal safety and digital safety filter 220 is resident as an application or firmware on the mobile computing device 300.

In an exemplary embodiment, the administration and configuration of the mobile personal safety and digital safety filter 220 comprises rules engine 248 modules, filter 250 modules, monitoring and analysis 252 modules, and logging and alerting modules 254. In operation, resident on the mobile computing device 300, the rules engine 248 modules and the filtering 250 modules are synchronized with the remote data processing rules engine 248 modules and the filtering 250 modules.

The monitoring and analysis 252 series of data processing modules 238 on the mobile computing device 300 are synchronized with the remote data processing resource 204 from an algorithm and processing technique point of view. In this regard, without the reliance on the network protection appliance 208 or the remote data processing resource 204, when the plurality of data is received at the mobile computing device 300 it can be analyzed to determine the types, kinds, content, and/or received from/sent to locations to make decisions on the user's 404 personal safety concerns and digital content filtering concerns in view of the predetermined settings, parameters, and rules. The activity is deduced, organized, stored, and included on activity reports 240 that when necessary can be sent to the observer 402 by way of push notifications 242 or other methods as may be required and/or desired in a particular embodiment.

A series of logging and alert modules 254 comprises local logging modules 272, activity reports 240 modules, and push and other types and kinds of notification generator 242.

As far as functionality, the activity reports module 240 and push and other types and kinds of notification generator 242 can be synchronized with the remote data processing resource 204. Additionally, as appropriate, certain activity reports can be synchronized with the remote data processing resource 204.

Local activity on the mobile computing device 300 can log or otherwise receive and store, from the monitoring and analysis 252 modules local device activity, sensor readings, and other data in the local logging modules 272 as may be required and/or desired in a particular embodiment.

Additionally, the activity report 240 modules can receive and store, from the monitoring and analysis 252 modules, the analyzed data summary in the activity report type formats. The activity report 240 modules log the activity and prepare alert messages, usages reports, and other types and kinds of organized activity information as may be required and or desired in a particular embodiment. The activity reports can vary in types and kinds as may be required and/or desired in a particular embodiment.

The push and other types and kinds of notification generator 242 send messages and reports 244 generated by local logging 270 modules, the activity reports 240 modules to the observer 402 and other designated administrators. Such messages and reports can be sent by way of text messages, emails, robocalls, or other types and or kinds of methods as may be required and/or desired in a particular embodiment.

Figure 12:
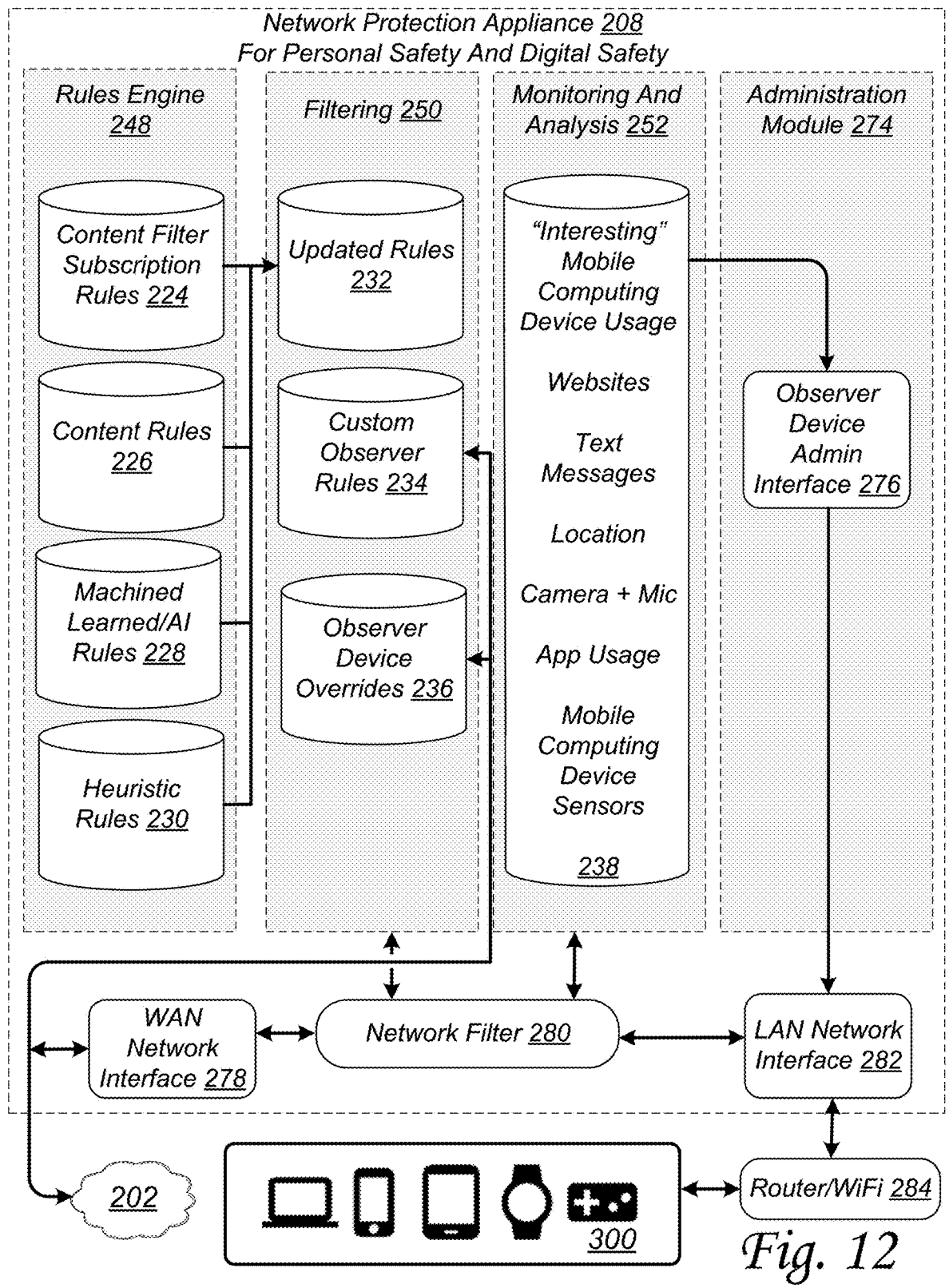
FIG. 12 illustrates one example of administration and configuration of the network protection appliance 208 for personal safety and digital safety.

Referring to FIG. 12, there is illustrated one example of the administration and configuration of the network protection appliance 208 for personal safety and digital safety. The administration and configuration of the network protection appliance 208 are resident as firmware on the network appliance 208.

In an exemplary embodiment, the administration and configuration of the network protection appliance 208 comprise rules engine 248 modules, filter 250 modules, monitoring and analysis 252 modules, and administration module 274. In operation, resident on the mobile computing device 300, the rules engine 248 modules and the filtering 250 modules are synchronized with the remote data processing 204 rules engine 248 modules and the filtering 250 modules.

The monitoring and analysis 252 series of data processing modules 238 on the network protection appliance 208 are synchronized with the remote data processing resource 204 from an algorithm and processing technique point of view. In this regard, without the reliance on the mobile computing device 300 or the remote data processing resource 204, when the plurality of data is received at the network protection appliance 208 it can be analyzed to determine the types, kinds, content, and received from/sent to locations to make decisions on the user's 404 personal safety concerns and digital content filtering concerns in view of the predetermined settings, parameters, and rules. The activity is deduced, organized, stored, and included in the observer device admin interface 276 setting and information as activity reports that can be synchronized with the data processing resource 204 activity reports 240 modules and when necessary can be sent to the observer 402 by way of the remote data processing 204 push notifications 242 or other methods as may be required and/or desired in a particular embodiment.

The administration module 274 comprises an observer device administration interface 276. In operation, the observer device administration interface 276 allows the observer 402 or other authorized administrators to view, edit, and save the setting, parameters, rules, and other data as may be required and/or desired in a particular embodiment. In addition, the observer device administration screen 276 can provide access to information, reports, logs, history, rules, and other data stored on the remote data processing resource 204 including information that is part of the activity reports 240 modules.

The wide area network (WAN) network interface 278 can be one of the appliance communication interfaces 604. The WAN network interface 278 connects the network protection appliance 208 through routers and other data processing equipment to the global communication network 202. A LAN network interface 282 can be one of the appliance communication interfaces 604. The LAN network interface 282 connects the network protection appliance 208 to the local area network by way of router/Wifi 284 in the home, business, or elsewhere.

In an exemplary embodiment, in operation, the WAN network interface data communicates with external data processing resources and the LAN network interface data communicates with internal data processing resources including the destination computing devices 300. The network filter 280 arbitrates between the plurality of data between the WAN network interface 278, the LAN network interface, the filtering 250 modules, and the monitoring and analysis 252 modules.

The network filter 208 functionality determines at least one data attribute by interrogating the plurality of data to deduce the type, kind, content, or location of the received information. A data block condition is determined by comparing the data attribute to one or more digital content filtering rules. The plurality of data is blocked from reaching the destination computing device 300 that is usable by user 404 or the mobile computing device 300 when the data block condition is true. And, the plurality of data is data communicated to the destination computing device 300 that is usable by the user 404 or the mobile computing device 300 when the data block condition is false. The mobile internet filter 220 operates similarly to the network filter 280 when the mobile computing device 300 is absent a LAN 212 environment connection and instead connected to a mobile environment 214 through a tower 210.

Figure 13A:
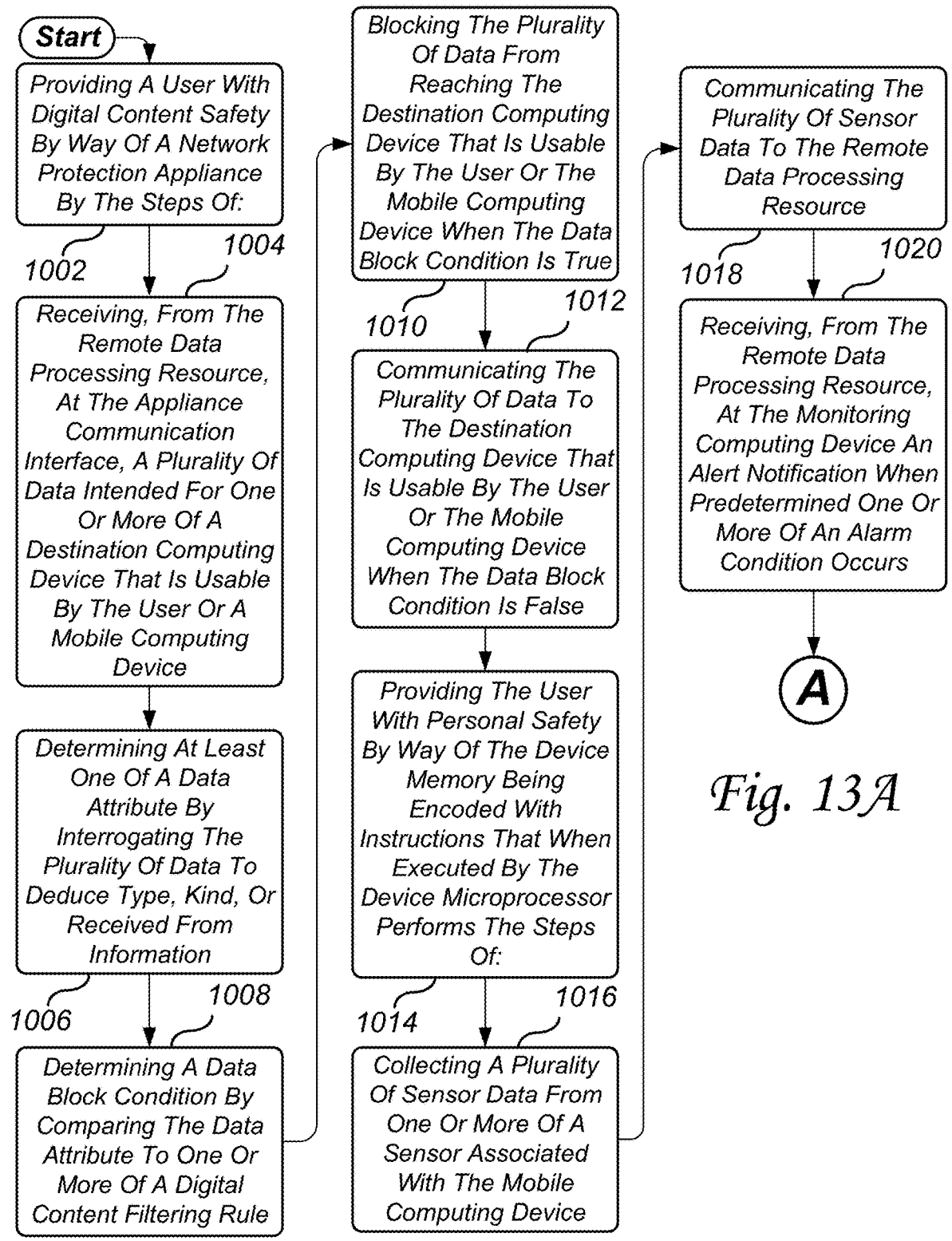
FIGS. 13A-B and 14A-B illustrates one example of a method of using a personal awareness system.
Figure 13B:
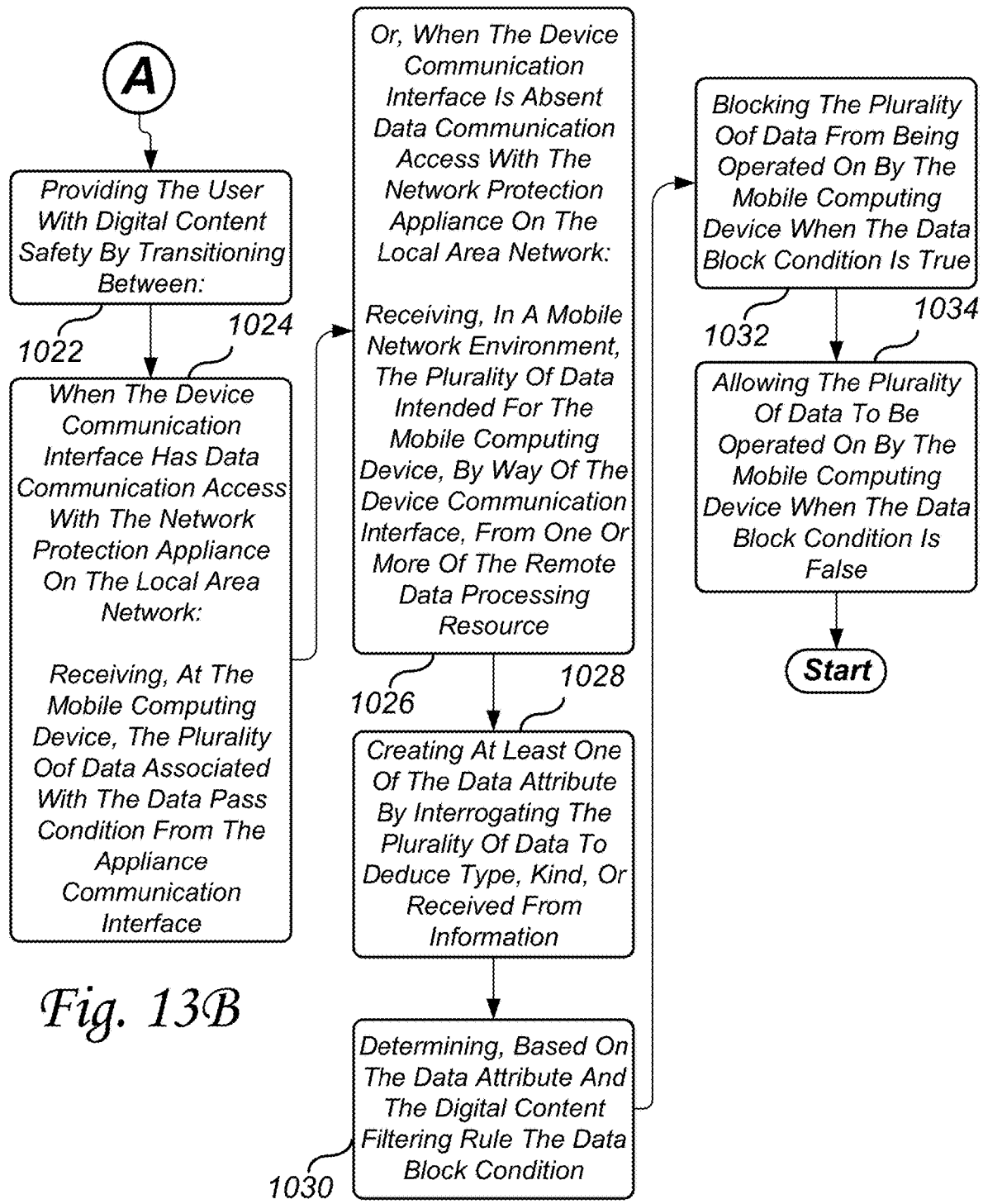

Referring to FIG. 13A-B, there is illustrated one example of a method of using a personal awareness system. In an exemplary embodiment, the method of using a personal awareness system for personal safety and digital content safety of a user begins in step 1002.

In step 1002, a user 404 is provided with digital content safety by way of a network protection appliance 208 comprising an appliance microprocessor 802, an appliance memory 806, and one or more appliance communication interfaces 804. The appliance memory 806, and the appliance communication interface 804 are operationally related to the appliance microprocessor 802. The network protection appliance is operationally related to a local area network (LAN) 212. The monitor computing device 302 by way of the monitor communication interface 504, the network protection appliance 208 by way of the appliance device communication interface 804, the mobile computing device 300 by way of the device communication interface 604, and one or more of a remote data processing resource 204 data communicate with each other over a global communication network 202. The appliance memory 806 is encoded with instructions that when executed by the appliance microprocessor 802 perform the steps 1004, 1006, 1008, 1010, and 1012. The method then moves to step 1004.

In step 1004, receiving, from the remote data processing resource 204, at the appliance communication interface 804, a plurality of data intended for one or more of a destination computing device 300 that is usable by the user 404 or a mobile computing device 300. The mobile computing device comprises a device microprocessor 602, a device memory 614, one or more of a sensor 608, and a device communication interface 604. The device memory 614, the sensor 608, and the device communication interface 604 is operationally related to the device microprocessor 602. The mobile computing device 300 is used by user 404. The method then moves to step 1006.

In step 1006, at least one data attribute is determined by interrogating the plurality of data to deduce type, kind, content, or received from location information. In an exemplary embodiment, such interrogation of the plurality of data can deduce what type of data it is such as streaming, pictures, webpage, URL, text message, executable file, and others. The interrogation of the plurality of data can also deduce what kind of data is secured, insecure, financial, personal, identity revealing, meta, and other data. Additionally, the location where the plurality of data originated from can be interrogated to deduce the country of origin, server location, website, network type, VPN data, and other location data. The method then moves to step 1008.

In step 1008, a data block (true or false) condition is determined by comparing the data attribute to one or more digital content filtering rules. In general, a "true" data block condition means to suppress the data and not pass the data to a destination computing device or operate on the data. A "false" data block condition means don't block the data instead pass the data to a destination computing device or operate on the data. The method then moves to step 1010.

In step 1010, the plurality of data is blocked from reaching the destination computing device 300 that is usable by user 404 or the mobile computing device 300 when the data block condition is true. The method then moves to step 1012.

In step 1012, the plurality of data is data communicated to the destination computing device 300 that is usable by the user 404 or the mobile computing device 300 when the data block condition is false. The method then moves to step 1014.

In step 1014, providing the user 404 with personal safety by way of the device memory 614 is encoded with instructions that when executed by the device microprocessor 602 perform steps 1016, 1018, and 1020. The method then moves to step 1016.

In step 1016, a plurality of sensor data is collected from one or more sensor 608 associated with the mobile computing device 300. In an exemplary embodiment, a mobile computing device 300 sensors can include motion and accelerometer, ambient condition sensors, user 404 heart rate, blood oxygen level, electrocardiogram (ECG), biometric, lidar, and other sensors, as may be required, and/or desired in a particular embodiment. The method then moves to step 1018.

In step 1018, the plurality of sensor data is communicated to the remote data processing resource 204, or one or more of a monitor computing device 302 for use by one or more observers 402. The monitor computing device 302 comprises a monitor microprocessor 502, a monitor memory 510, and a monitor communication interface 504. The monitor memory 510 and the monitor communication interface 504 are operationally related to the monitor microprocessor 502. The method then moves to step 1020.

In step 1020, the monitor memory 614 is encoded with instructions that when executed by the monitor microprocessor 602 performs the step of receiving, from the remote data processing resource 204, at the monitor computing device 302 an alert notification when predetermined one or more of an alarm condition occurs based, in part, on the plurality of sensor data, wherein personal safety of the user 404 is monitored by the observer 402 by way of the monitor computing device 302. The method then moves to step 1022.

In step 1022, user 404 is provided with digital content safety by transitioning between steps 1024 and 1026. The method then moves to step 1024.

In step 1024, when the device communication interface has data communication access with the network protection appliance 208 on the local area network 212, receiving when the data block condition is false, at the mobile computing device 300, the plurality of data from the appliance communication interface 804.

Or, in step 1026, when the device communication interface is absent data communication access with the network protection appliance on the local area network 212, receiving, in a mobile network environment 214, the plurality of data intended for the mobile computing device 300, by way of the device communication interface 604, from one or more of the remote data processing resource 204.

Continuing in step 1028 by creating at least one of the data attributes by interrogating the plurality of data to deduce type, kind, content, or received from location information. In an exemplary embodiment, such interrogation of the plurality of data can deduce what type of data it is such as streaming, pictures, webpage, URL, text message, executable file, and others. The interrogation of the plurality of data can also deduce what kind of data is secured, insecure, financial, meta, and other data. Additionally, the location where the plurality of data originated from can be interrogated to deduce the country of origin, server location, website, network type, VPN data, and other location data. The method then moves to step 1030.

In step 1030, determining, based on the data attribute and the digital content filtering rule the data block condition (true or false). The method then moves to step 1032.

In step 1032, blocking the plurality of data from being operated on by the mobile computing device 300 when the data block condition is true. The method then moves to step 1034.

In step 1034, allowing the plurality of data to be operated on by the mobile computing device 300 when the data block condition is false. Wherein the personal awareness system protects the personal safety of user 404 by monitoring the mobile computing device 300 sensor activity and protects the online digital safety of user 404 by filtering digital content accessible to user 404 using the digital content filtering rules by way of the network protection appliance 208 in the local area network environment 212 and by way of software encoded and executed on the mobile computing device 300 in the mobile network environment 214. The method then returns to step 1002.

Figure 14A:
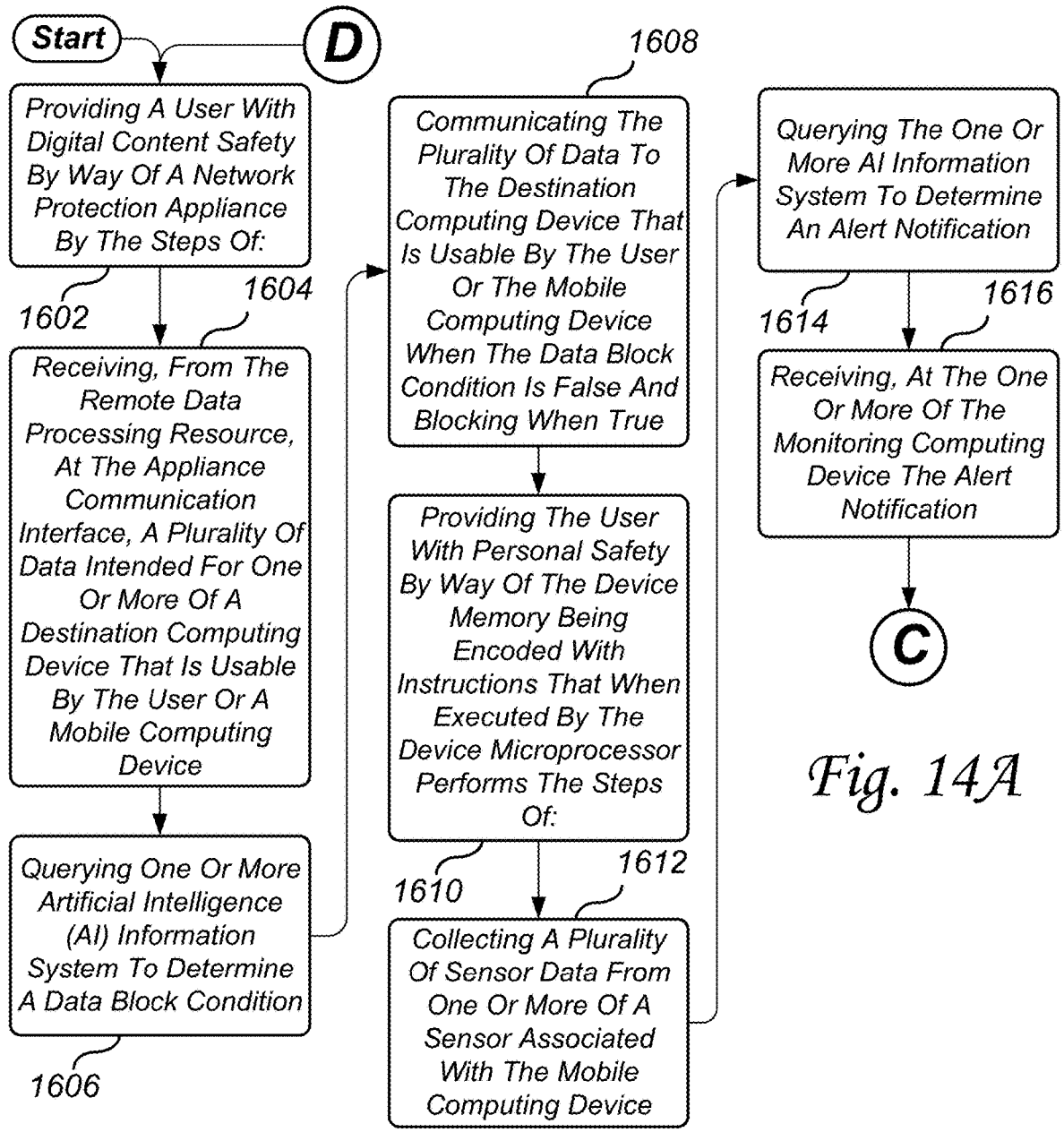
Figure 14B:
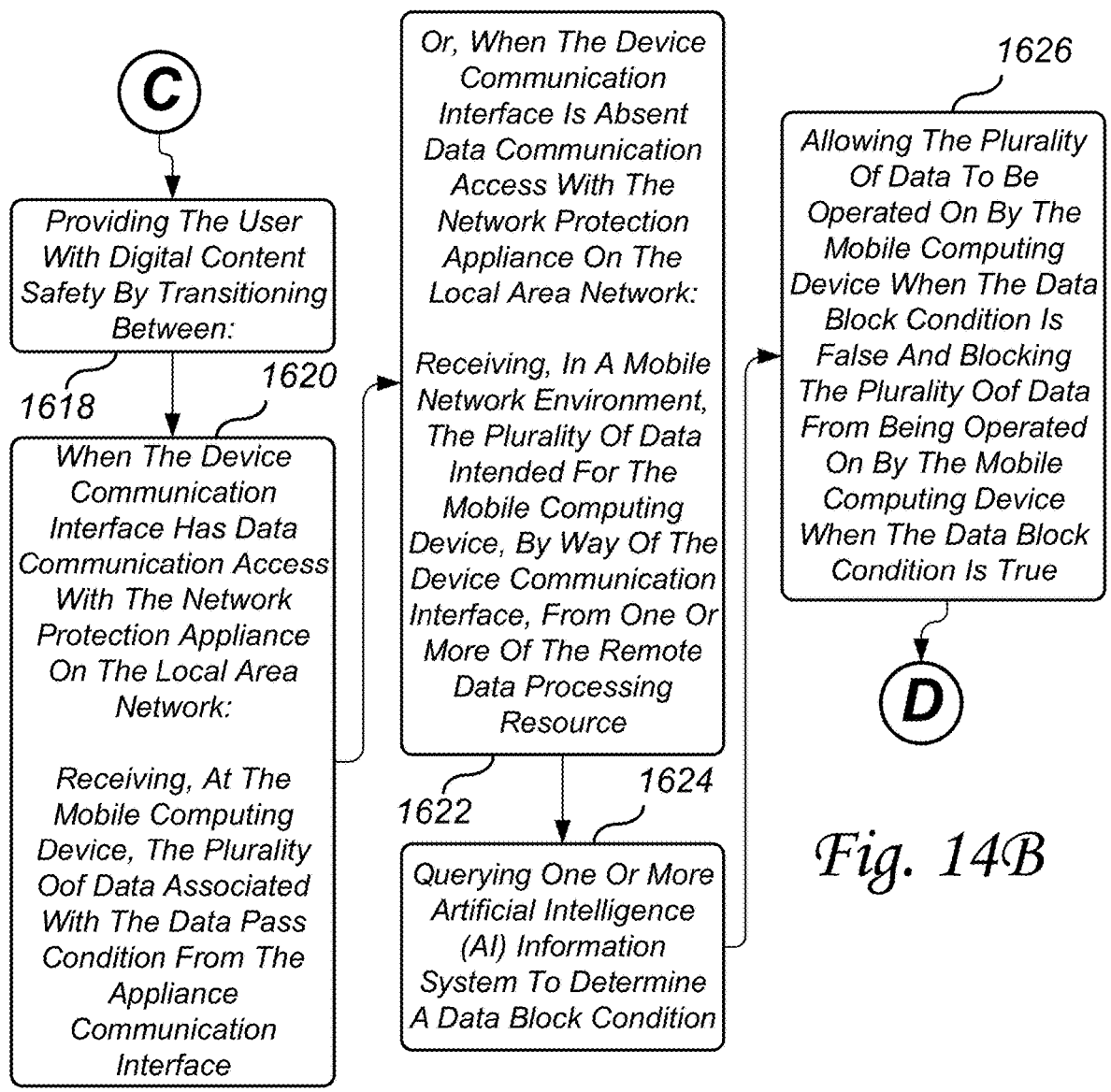

Referring to FIG. 14A-B, there is illustrated one example of a method of using a personal awareness system. In an exemplary embodiment, the method of using a personal awareness system for personal safety and digital content safety of a user begins in step 1602.

In step 1602, a user 404 is provided with digital content safety by way of a network protection appliance 208 comprising an appliance microprocessor 802, an appliance memory 806, and one or more appliance communication interfaces 804. The appliance memory 806, and the appliance communication interface 804 are operationally related to the appliance microprocessor 802. The network protection appliance is operationally related to a local area network (LAN) 212. The monitor computing device 302 by way of the monitor communication interface 504, the network protection appliance 208 by way of the appliance device communication interface 804, the mobile computing device 300 by way of the device communication interface 604, and one or more of a remote data processing resource 204 data communicate with each other over a global communication network 202. The appliance memory 806 is encoded with instructions that when executed by the appliance microprocessor 802 perform the steps 1604, 1606, and 1608. The method then moves to step 1604.

In step 1604, receiving, from the remote data processing resource 204, at the appliance communication interface 804, a plurality of data intended for one or more of a destination computing device 300 that is usable by the user 404 or a mobile computing device 300. The mobile computing device comprises a device microprocessor 602, a device memory 614, one or more of a sensor 608, and a device communication interface 604. The device memory 614, the sensor 608, and the device communication interface 604 are operationally related to the device microprocessor 602. The mobile computing device 300 is used by user 404. The method then moves to step 1606.

In step 1606, one or more artificial intelligence (AI) information system 194 is queried to determine a data block condition, wherein one or more AI information system 294 interrogates the plurality of data in view of one or more of a digital content filtering rule to deduce type, kind, content, or received from location information. In an exemplary embodiment, such interrogation of the plurality of data can deduce what type of data it is such as streaming, pictures, webpage, URL, text message, executable file, and others. The interrogation of the plurality of data can also deduce what kind of data is secured, insecure, financial, personal, identity revealing, meta, and other data. Additionally, the location where the plurality of data originated from can be interrogated to deduce the country of origin, server location, website, network type, VPN data, and other location data. The method then moves to step 1608.

In step 1608, a data block (true or false) condition is determined by comparing the data attribute to one or more digital content filtering rules. In general, a "true" data block condition means to suppress the data and not pass the data to a destination computing device or operate on the data. A "false" data block condition means don't block the data instead pass the data to a destination computing device or operate on the data.

In operation, the plurality of data is data communicated to the destination computing device 300 that is usable by the user 404 or the mobile computing device 300 when the data block condition is false and blocked when the data block condition is true. The method then moves to step 1610.

In step 1610, providing the user 404 with personal safety by way of the device memory 614 is encoded with instructions that when executed by the device microprocessor 602 perform steps 1612 and 1614. The method then moves to step 1612.

In step 1612, a plurality of sensor data is collected from one or more sensor 608 associated with the mobile computing device 300. In an exemplary embodiment, a mobile computing device 300 sensors can include motion and accelerometer, ambient condition sensors, user 404 heart rate, blood oxygen level, electrocardiogram (ECG), biometric, lidar, and other sensors, as may be required, and/or desired in a particular embodiment. The method then moves to step 1614.

In step 1614, one or more AI information systems are queried to determine an alert notification based, in part, on the plurality of sensor data. The method then moves to step 1616.

In step 1616, the monitor memory 614 is encoded with instructions that when executed by the monitor microprocessor 602 performs the step of receiving, from the remote data processing resource 204, at the monitor computing device 302 the alert notification when predetermined one or more of an alarm condition occurs based, in part, on the plurality of sensor data, wherein personal safety of the user 404 is monitored by the observer 402 by way of the monitor computing device 302. The method then moves to step 1618.

In step 1618, user 404 is provided with digital content safety by transitioning between steps 11620 and 1622. The method then moves to step 1024.

In step 1620, when the device communication interface has data communication access with the network protection appliance 208 on the local area network 212, receiving when the data block condition is false, at the mobile computing device 300, the plurality of data from the appliance communication interface 804.

Or, in step 1622, when the device communication interface is absent data communication access with the network protection appliance on the local area network 212, receiving, in a mobile network environment 214, the plurality of data intended for the mobile computing device 300, by way of the device communication interface 604, from one or more of the remote data processing resource 204.

Continuing in step 1624 by querying the one or more AI information system 294 to determine the data block condition, wherein the one or more AI information systems interrogates the plurality of data in view of one or more of the digital content filtering rule to deduce type, kind, content, or received from location information. In an exemplary embodiment, such interrogation of the plurality of data can deduce what type of data it is such as streaming, pictures, webpage, URL, text message, executable file, and others. The interrogation of the plurality of data can also deduce what kind of data is secured, insecure, financial, meta, and other data. Additionally, the location where the plurality of data originated from can be interrogated to deduce the country of origin, server location, website, network type, VPN data, and other location data. The method then moves to step 1626.

In step 1626, allowing the plurality of data to be operated on by the mobile computing device 300 when the data block condition is false. Wherein the personal awareness system protects the personal safety of user 404 by monitoring the mobile computing device 300 sensor activity and protects the online digital safety of user 404 by filtering digital content accessible to user 404 using the digital content filtering rules by way of the network protection appliance 208 in the local area network environment 212 and by way of software encoded and executed on the mobile computing device 300 in the mobile network environment 214. And, blocking the plurality of data from being operated on by the mobile computing device 300 when the data block condition is true. The method then returns to step 1602.

Figure 15:
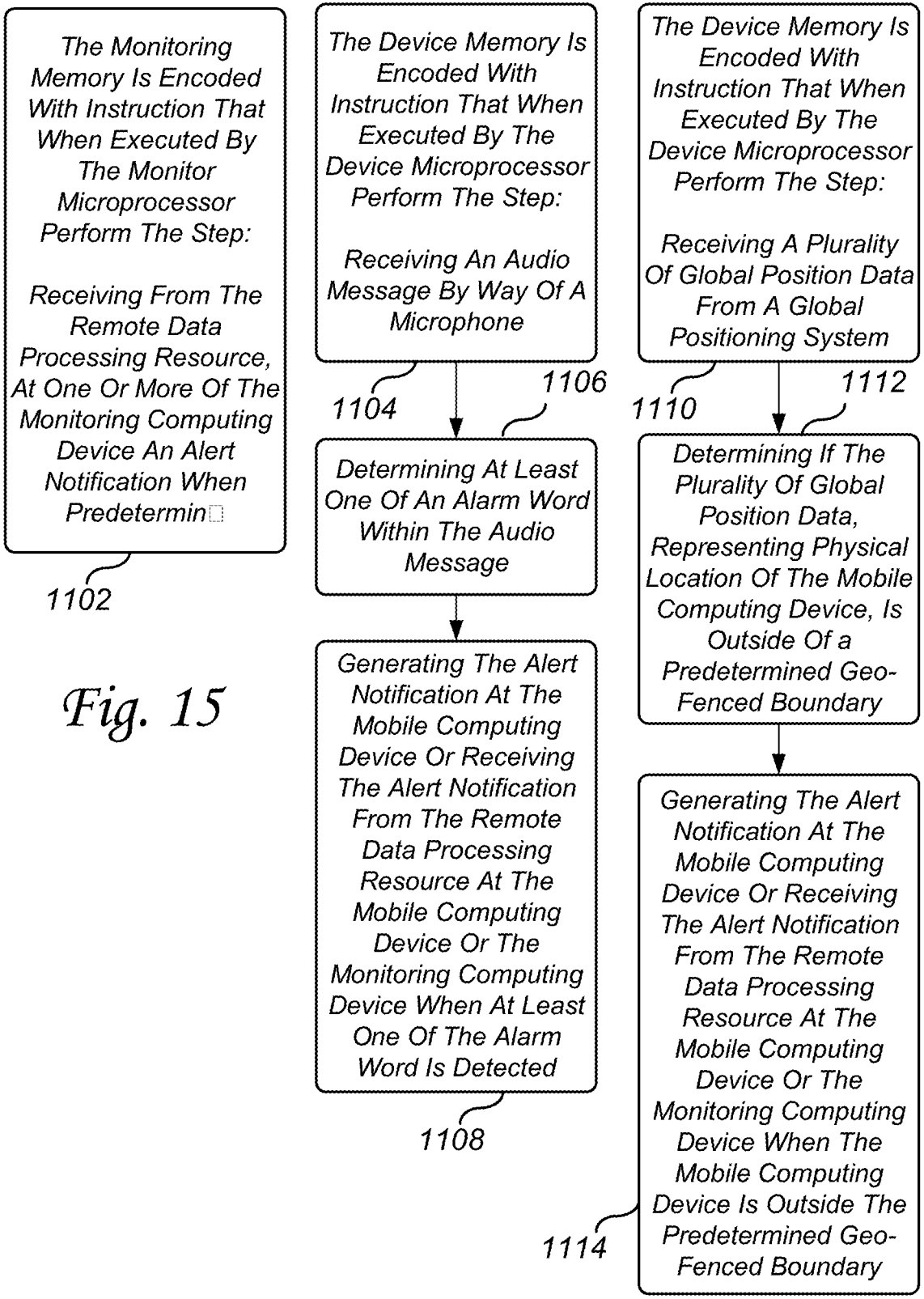
FIGS. 15-18 illustrates exemplary embodiments that can be used interchangeably with the method of using a personal awareness system.

Referring to FIG. 15, there are illustrated exemplary embodiments that can be used interchangeably with the method of using a personal awareness system.

In step 1102, the monitor memory 510 is encoded with instructions that when executed by the monitor microprocessor 502 performs the step receiving from the remote data processing resource 204, at one or more of the monitor computing device 302, an alert notification when predetermined one or more of an alarm condition occurs based, in part, on the data attribute.

In step 1104, the device memory 614 is encoded with instructions that when executed by the device microprocessor 602 perform steps 1104, 1106, and 1108. In step 1104, receiving an audio message by way of a microphone 622. The microphone 622 is operationally related to the device microprocessor 602. The method moves to step 1106.

In step 1106, at least one alarm word is determined within the audio message, at the mobile computing device 300, or by way of sending the audio message to the remote data processing resource 204 for determination. In an exemplary embodiment, the audio message can be speech processed to determine words and sounds that are heard. Such words can be compared to a list of alarm words such as gun, threat, shot, hurt, caution, porn, hate, and many other words. In addition sounds such as a gunshot, scream, siren, and many other sounds can be converted into alarm words. The alarm word list can be managed by observer 402 or other administrators. The method then moves to step 1108.

In step 1108, generating the alert notification at the mobile computing device 300 or receiving the alert notification from the remote data processing resource 204 at the mobile computing device 300 or the monitor computing device 302 when at least one of the alarm words is detected. In an exemplary embodiment, such alarm notification can be an email, a text message, an activity report, a robocall, or other automated warning message or contact with the observer 402, selectively (if configured) the user 404, law enforcement, medical services, security monitoring service, communication with other authorized persons or organization, or other types and kinds of alarm notification as may be required and/or desired in a particular embodiment.

In step 1110, the device memory 614 is encoded with instructions that when executed by the device microprocessor 602 perform steps 1110, 1112, and 1114. In step 1110, a plurality of global position data is received from a global positioning system (GPS) 620. The global positioning system 620 is operationally related to the device microprocessor 602. Such plurality of GPS data indicates the physical location of the mobile computing device 300 being used by the user 404. The method then moves to step 1112.

In step 1112, determining if the plurality of global position data, representing the physical location of the mobile computing device 300, is outside of a predetermined geo-fenced boundary, at the mobile computing device 300 or by way of sending the plurality of global position data to the remote data processing resource 204 for determination. The method then moves to step 1114.

In step 1114, generating the alert notification at the mobile computing device 300 or receiving the alert notification from the remote data processing resource 204 at the mobile computing device 300 or the monitor computing device 302 when the mobile computing device 300 is outside the predetermined geo-fenced boundary. In an exemplary embodiment, such alarm notification can be an email, a text message, an activity report, a robocall, or other automated warning message or contact with the observer 402, selectively (if configured) the user 404, law enforcement, medical services, security monitoring service, or other authorized persons or organization.

Figure 16:
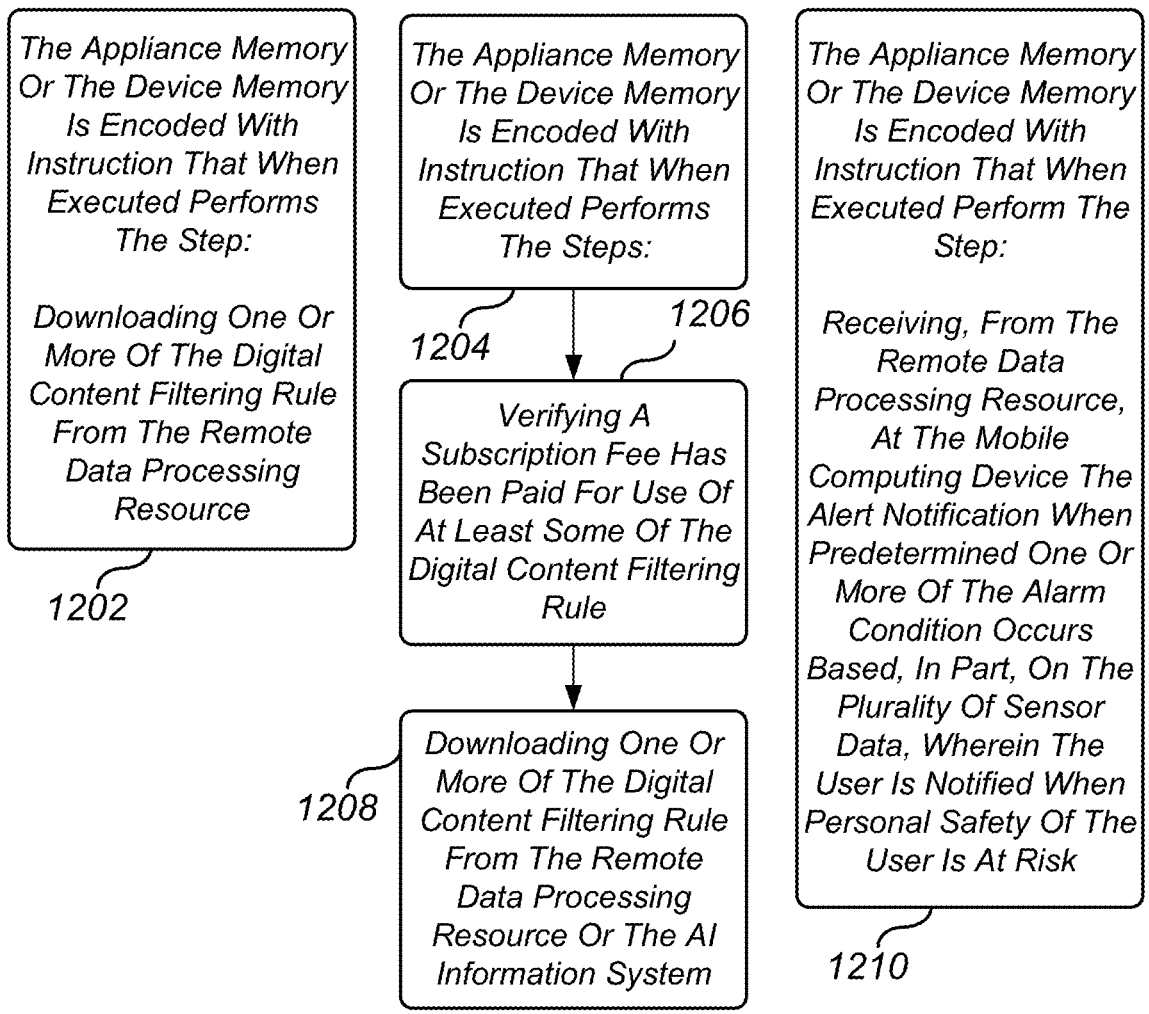

Referring to FIG. 16, there are illustrated exemplary embodiments that can be used interchangeably with the method of using a personal awareness system.

In step 1202, the appliance memory 806 or the device memory 614 are encoded with instructions that when executed perform the step of downloading one or more of the digital content filtering rule from the remote data processing resource 204 to the appliance memory 806 and the device memory 614.

In step 1204, the appliance memory 806 or the device memory 614 are encoded with instructions that when executed perform steps 1206 and 1208. The method then moves to step 1206.

In step 1206, verifying a subscription fee has been paid for the use of at least some of the digital content filtering rules. In an exemplary embodiment, a subscription fee can be paid by the observer, administrator, or other parties for the use of the digital content filters. Such subscription-based digital content filter rules can be those developed by other organizations such as schools, law enforcement, churches, and others. These organizations can develop their own digital content filter rules and then monetize their use of them by allowing them to be downloaded to other network appliances and mobile computing devices for a subscription fee. The method then moves to step 1208.

In step 1208, downloading, upon payment verification, one or more of the digital content filtering rules from the data processing resource to the appliance memory 806 and the device memory 614.

In step 1210, the appliance memory 806 or the device memory 614 is encoded with instructions that when executed perform the step of receiving, from the remote data processing resource 204, at the mobile computing device 300, the alert notification when the predetermined one or more of the alarm condition occurs based, in part, on the plurality of sensor data, wherein the user is notified when personal safety of the user 404 is at risk.

Figure 17:
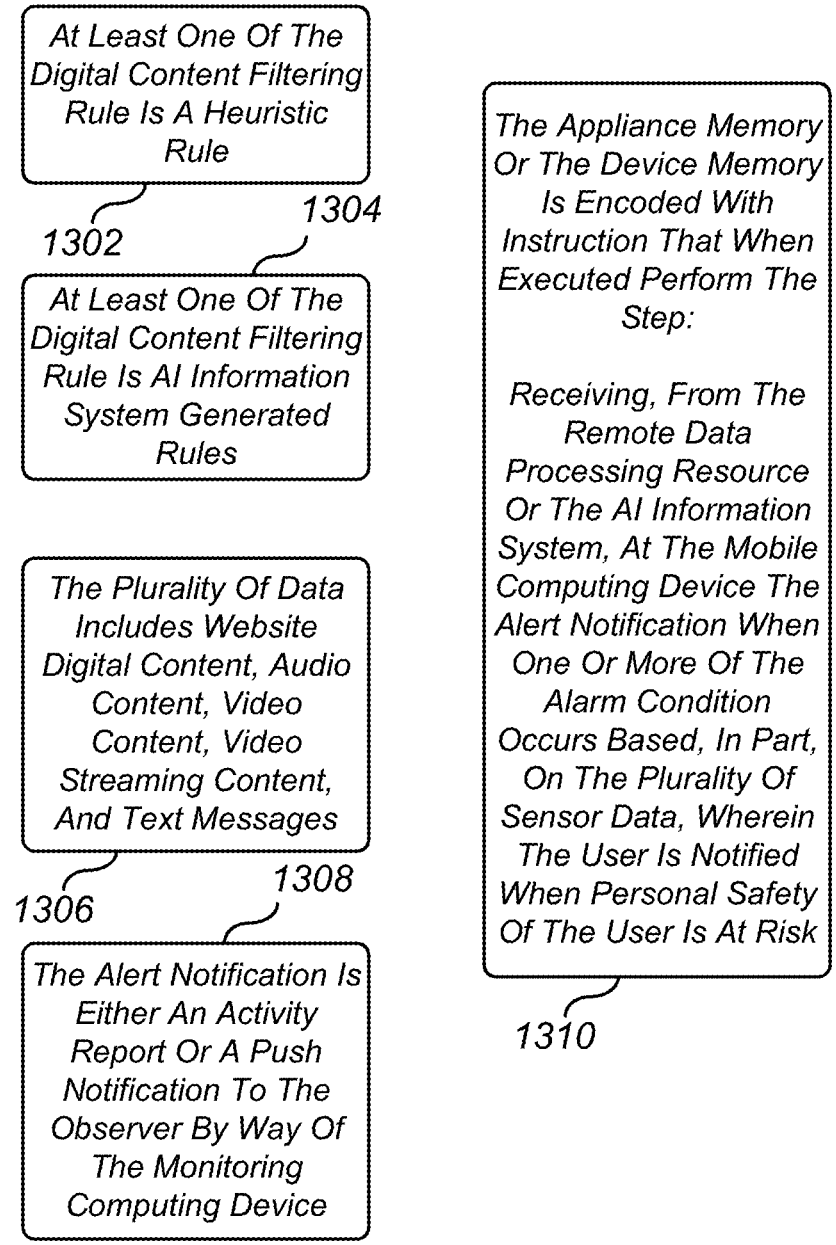

Referring to FIG. 17, there are illustrated exemplary embodiments that can be used interchangeably with the method of using a personal awareness system.

In step 1302, at least one digital content filtering rule is a heuristic rule.

In step 1304, at least one digital content filtering rule is an artificial intelligence information system 294 generated rule.

In step 1306, the plurality of data includes website digital content, audio content, video content, video streaming content, and text messages.

In step 1308, the alert notification is either an activity report or a push notification delivered to observer 402 by way of the monitor computing device 302.

In step 1310, the appliance memory 806 or the device memory 614 can be encoded with instructions that when executed perform the step of receiving, from one or more of the remote data processing resource 204/224A-B or the one or more AI information system 294, at the mobile computing device 300 the alert notification when one or more of the alarm condition occurs based, in part, on the plurality of sensor data, wherein the user is notified when personal safety of the user is at risk.

Figure 18:
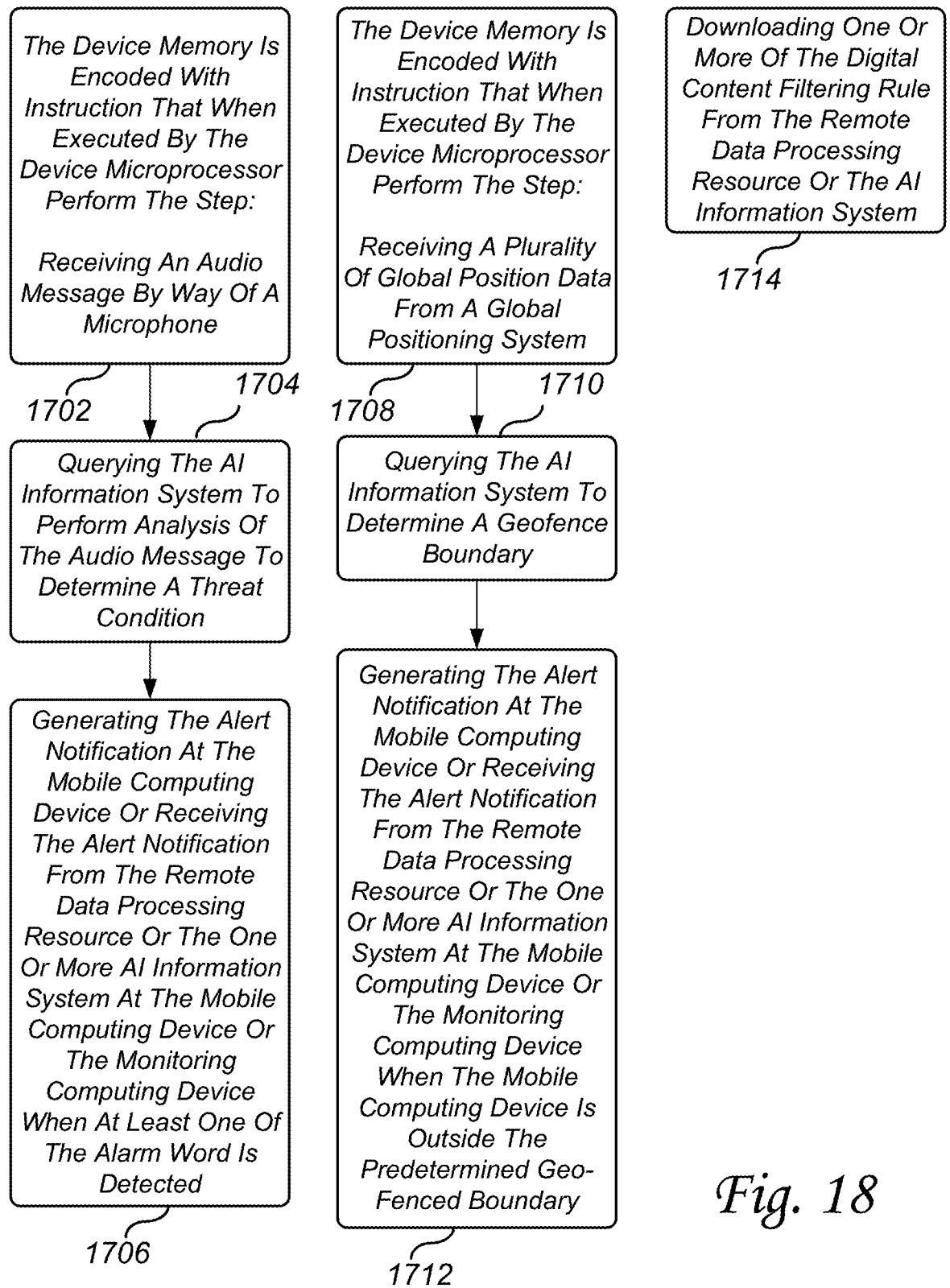

Referring to FIG. 18, there are illustrated exemplary embodiments that can be used interchangeably with the method of using a personal awareness system.

In step 1702, the device memory 614 is encoded with instructions that when executed by the device microprocessor 602 performs steps 1704 and 1706. In step 1704, receiving an audio message by way of a microphone 622. The microphone 622 is operationally related to the device microprocessor 602. The method moves to step 1704.

In step 1704, the AI information system 294 is queried to perform an analysis of the audio message to determine a threat detection. The method then moves to step 1706.

In step 1706, generating the alert notification at the mobile computing device 300 or receiving the alert notification from the remote data processing resource 204 or the AI information system 294 at the mobile computing device 300 or the monitor computing device 302 when at least one of the alarm words is detected. In an exemplary embodiment, such alarm notification can be an email, a text message, an activity report, a robocall, other automated warning message, or contact with the observer 402, selectively (if configured) the user 404, law enforcement, medical services, security monitoring service, communication with other authorized persons or organization, or other types and kinds of alarm notification as may be required and/or desired in a particular embodiment.

In step 1708, the device memory 614 is encoded with instructions that when executed by the device microprocessor 602 perform steps 1710 and 1712. In step 1710, a plurality of global position data is queried from one or more AI information systems 294 to determine a geo-fenced boundary-based, in part, on the plurality of global position data received from a global positioning system (GPS) 620. The global positioning system 620 is operationally related to the device microprocessor 602. Such plurality of GPS data indicates the physical location of the mobile computing device 300 being used by the user 404. The method then moves to step 1712.

In step 1712, generating the alert notification at the mobile computing device 300 or receiving the alert notification from the remote data processing resource 204 or the AI information system 294 at the mobile computing device 300 or the monitor computing device 302 when the mobile computing device 300 is outside the predetermined geo-fenced boundary. In an exemplary embodiment, such alarm notification can be an email, a text message, an activity report, a robocall, or other automated warning message or contact with the observer 402, selectively (if configured) the user 404, law enforcement, medical services, security monitoring service, or other authorized persons or organization.

In step 1714, downloading, upon payment verification, one or more of the digital content filtering rules from the data processing resource or the AI Information system 294.

Figure 19:
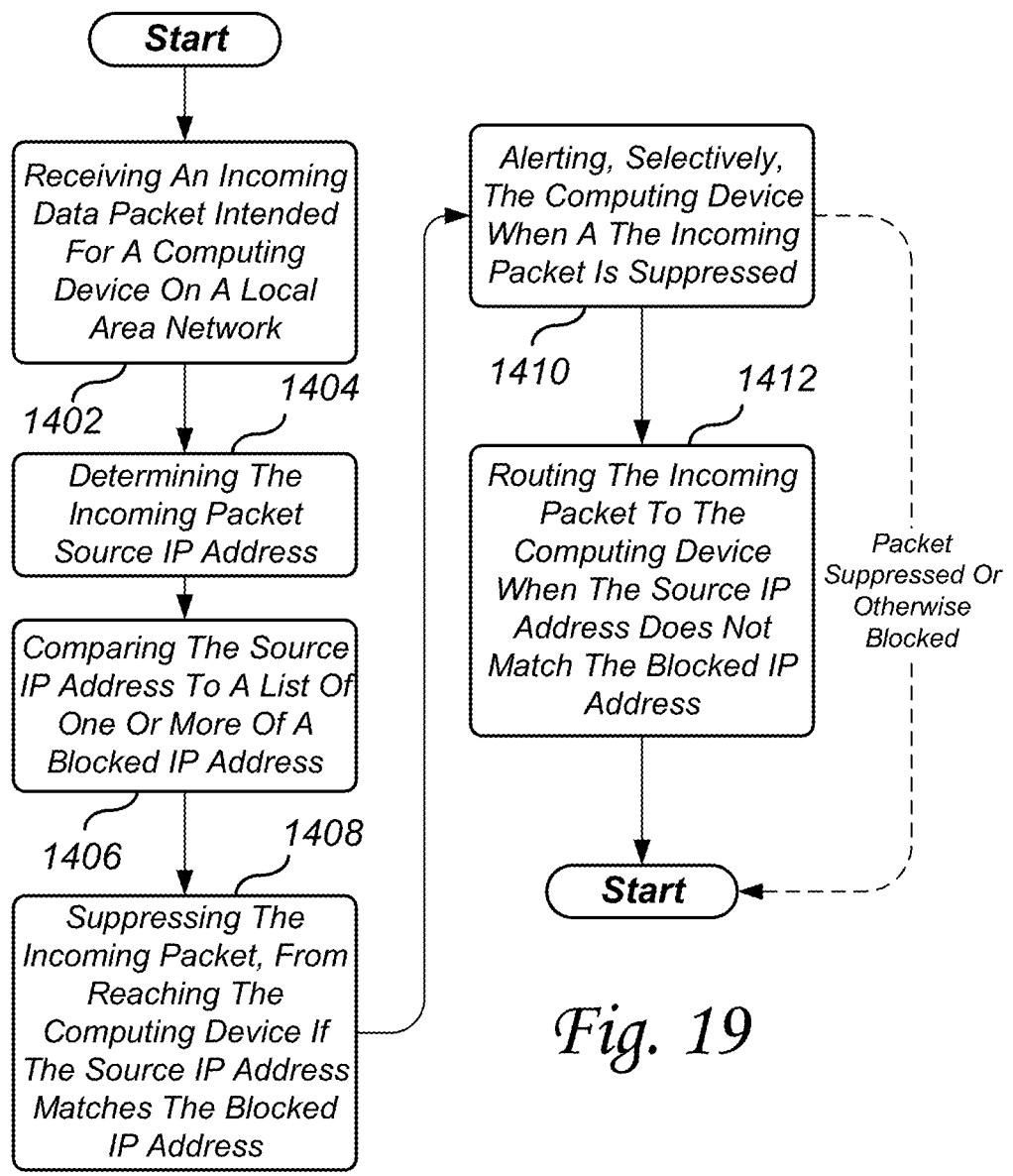
FIG. 19 illustrates one example of a method of using a network protection appliance to control, filter, and suppress digital content when the network protection appliance is online.

Referring to FIG. 19, there is illustrated one example of a method of using a network protection appliance 208 to control, filter, and suppress digital content when the network protection appliance 208 is online. In an exemplary embodiment, when the network protection appliance 208 is operating in an online mode, receiving incoming data packets from external data processing resources, the source Internet protocol (IP) address associated with the incoming data packet is identified and compared to a list of blocked IP addresses. Based on the results of the comparison the data packet is either be suppressed or routed to the intended destination computing device 300. The method begins in step 1402.

In step 1402, an incoming data packet that is intended for one or more of the destination computing devices 300 on the local area network 212 is received or otherwise intercepted by the network protection appliance 208. The method moves to step 1404.

In step 1404, the source IP address of the incoming data packet is determined by the network protection appliance 208. The method moves to step 1406.

In step 1406, the source IP address is compared to a list of one or more blocked IP addresses by the network protection appliance 208. The method moves to step 1408.

In step 1408, if the source IP address is the same as one of the blocked internet protocols (IP) addresses in the list the network protection appliance 208 suppresses or otherwise blocks the incoming data packet from reaching the intended destination computing device 300 on the local area network 212. The method moves to step 1410.

In step 1410, selectively, the monitor computing device 302 can be alerted by the network protection appliance 208 when an incoming data packet is suppressed and the method returns to start in step 1402. In the alternative, the method moves to step 1412.

In step 1412, the incoming data packet is routed, by the network protection appliance 208, to the destination computing device 300 when the source IP address does not match one of the blocked IP addresses. The method returns to start in step 1402.

Figure 20:
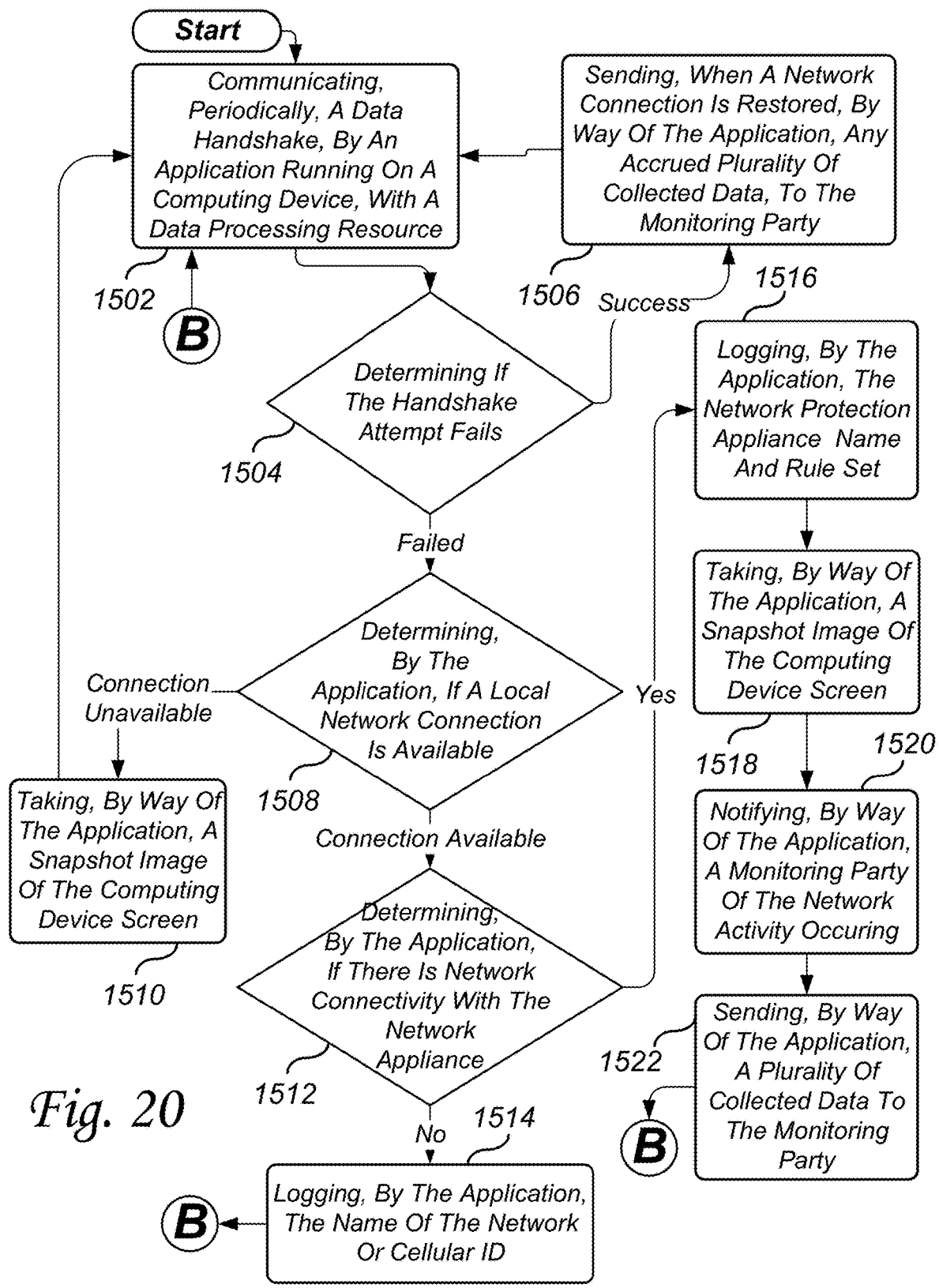
FIG. 20 illustrates one example of a method of using a network protection appliance to control, filter, and suppress digital content when the network protection appliance is offline.

Referring to FIG. 20, there is illustrated one example of a method of using a network protection appliance 208 to control, filter, and suppress digital content when the network protection appliance 208 is offline. The method begins in step 1502.

In step 1502, a data handshake is communicated, periodically, between an application running on a computing device and a data processing resource 204. The computing device is either a monitor computing device 302, a destination computing device, or a mobile computing device 300. The method then moves to step 1504.

In step 1504, a determination is made if the handshake attempt fails. If the handshake attempt fails the method moves to step 1508. In the alternative, the method moves to step 1506.

In step 1506, when a network connection is restored, by way of the application, any accrued plurality of collected data, from offline monitoring, is sent to a monitoring party. Such plurality of collected data can include, for example, and not a limitation, screenshots from the computing device, computing device user's 404 activity including use of applications, downloads, browser history, and other data, as may be required and/or desired in a particular embodiment. Such monitoring party can be a technical support group or agency that monitors the network and user activity on the network, an observer 402, or other similar type and kind of network activity monitoring software or agents, as may be required and/or desired in a particular embodiment. The method moves back to step 1502.

In step 1508, a determination is made, by the application, if a local area network 212 connection is available. If the resultant is in the affirmative, that is a local area network 212 connection is available then the method moves to step 1512. In the alternative, the method moves to step 1510.

In step 1510, a snapshot or screenshot image of the computing device screen is taken, by way of the application, and stored as a part of the plurality of collected data. The method moves back to step 1502.

In step 1512, a determination is made, by the application, if there is network connectivity with the network protection appliance 208. If the resultant is in the affirmative, that is there is a network connection with the network protection appliance 208 then the method moves to step 1516. In the alternative, the method moves to step 1514.

In step 1514, the application logs the name of the network, cellular ID, or other data as part of the plurality of collected data. The method then moves back to step 1502.

In step 1516, the network protection appliance 208 network name and ruleset are logged by the application. Such a ruleset determines how the application will control, filter, suppress, log, and otherwise act on incoming data packets to the computing device the application is running on. The method moves to step 1518.

In step 1518, a snapshot or screenshot image of the computing device screen is taken, by way of the application, and stored as a part of the plurality of collected data. The method moves back to step 1520.

In step 1520, by way of the application, a monitoring party is notified of the network activity occurring on the computing platform being monitored by the application. The method moves to step 1522.

In step 1522, by way of the application, a plurality of collected data that represents the activity of the user on the computing device is sent to the monitoring party. The method then returns to step 1502.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements.

What is claimed is:

1. A personal awareness system used for personal safety and digital content safety of a user comprising:
    one or more of a monitor computing device for use by one or more of an observer, the one or more of the monitor computing device comprising a monitor microprocessor, a monitor memory, and a monitor communication interface, the monitor memory and the monitor communication interface are operationally related to the monitor microprocessor;
    a mobile computing device comprising a device microprocessor, a device memory, one or more of a sensor, and a device communication interface, the device memory, the one or more of the sensor, and the device communication interface are operationally related to the device microprocessor, the mobile computing device is used by a user;
    a network protection appliance comprising an appliance microprocessor, an appliance memory, and one or more of an appliance communication interface, the appliance memory, and the one or more of the appliance communication interface are operationally related to the appliance microprocessor, the network protection appliance is operationally related to a local area network, the one or more of the monitor computing device by way of the monitor communication interface, wherein the network protection appliance by way of the one or more of the appliance communication interface, the mobile computing device by way of the device communication interface, and one or more of a remote data processing resource data communicate with each other over a global communication network;
    the appliance memory is encoded with instructions that when executed by the appliance microprocessor performs the steps of:
        providing the user with digital content safety by:
            receiving, from the one or more of the remote data processing resource, at the one or more of the appliance communication interface, a plurality of data intended for one or more of a destination computing device usable by the user or the mobile computing device;
            querying one or more artificial intelligence (AI) information system to determine a data block condition, wherein the one or more AI information system interrogates the plurality of data in view of one or more of a digital content filtering rule; and
            communicating the plurality of data to the one or more of the destination computing device usable by the user or the mobile computing device when the data block condition is false and blocking the plurality of data from reaching the one or more of the destination computing device when the data block condition is true;
    the device memory is encoded with instructions that when executed by the device microprocessor performs the steps of:
        providing the user with personal safety by:
            collecting a plurality of sensor data from the one or more of the sensor associated with the mobile computing device; and querying the one or more AI information system to determine an alert notification based, in part, on the plurality of sensor data;

the monitor memory is encoded with instructions that when executed by the monitor microprocessor performs the steps of:

receiving, at the one or more of the monitor computing device the alert notification, wherein personal safety of the user is monitored by the observer by way of the one or more of the monitor computing device;

providing the user with digital content safety by transitioning between:

when the device communication interface has data communication access with the network protection appliance on the local area network:

receiving when the data block condition is false, at the mobile computing device, the plurality of data associated from the one or more of the appliance communication interface;

or, when the device communication interface is absent data communication access with the network protection appliance on the local area network:

receiving, in a mobile network environment, the plurality of data intended for the mobile computing device, by way of the device communication interface, from one or more of the one or more of the remote data processing resource;

querying the one or more AI information system to determine the data block condition, wherein the one or more AI information system interrogates the plurality of data in view of one or more of the digital content filtering rule; and allowing the plurality of data to be operated on by the mobile computing device when the data block condition is false and blocking the plurality of data from being operated on by the mobile computing device when the data block condition is true;

wherein the personal awareness system protects personal safety of the user by monitoring mobile computing device sensor activity and protects online digital safety of the user by filtering digital content accessible to the user using the one or more of the digital content filtering rule by way of the network protection appliance in the local area network environment and by way of software encoded and executed on the mobile computing device in the mobile network environment.

2. The personal awareness system in accordance with claim 1, the monitor memory is encoded with instructions that when executed by the monitor microprocessor performs the step of: receiving from the one or more of the remote data processing resource or the one or more AI information system, at one or more of the one or more of the monitor computing device, the alert notification when one or more of the alarm condition occurs based, in part, on the one or more of the digital content filtering rule.

3. The personal awareness system in accordance with claim 1, the plurality of sensor data includes at least one of the following: data based on an accelerometer reading, data based on a global position system readings, data based on a camera taking pictures or video images, data based on a microphone, data based on a heart rate sensor reading, data based on a blood oxygen level sensor, data based on an echocardiogram sensor reading, or data based on a panic set of keystrokes entered by the user on a touch screen, the mobile computing device comprises the accelerometer, the global position system, the microphone, the heart rate sensor, the echocardiogram sensor, and the touch screen, furthermore the accelerometer, the global position system, the microphone, the heart rate sensor, the blood oxygen level sensor, the echocardiogram sensor, and the touch screen are operationally related to the device microprocessor.

4. The personal awareness system in accordance with claim 1, the device memory is encoded with instructions that when executed by the device microprocessor performs the steps of:

receiving an audio message by way of a microphone, the microphone is operationally related to the device microprocessor;

querying the AI information system to perform analysis of the audio message to determine a threat detection; and generating when the threat detection is detected, the alert notification at the mobile computing device or receiving the alert notification from the one or more of the remote data processing resource at the mobile computing device or the one or more of the monitor computing device.

5. The personal awareness system in accordance with claim 1, the device memory is encoded with instructions that when executed by the device microprocessor performs the steps of:

receiving a plurality of global position data from a global positioning system, the global positioning system is operationally related to the device microprocessor;

querying from the one or more AI information system to determine a geo-fenced boundary based, in part, on the plurality of global position data;

determining if the plurality of global position data, representing physical location of the mobile computing device is outside of the geo-fenced boundary; and generating the alert notification at the mobile computing device or receiving the alert notification from the one or more of the remote data processing resource or the one or more AI information system at the mobile computing device or at the one or more of the monitor computing device when the mobile computing device is outside the geo-fenced boundary.

6. The personal awareness system in accordance with claim 1, the appliance memory and the device memory are encoded with instructions that when executed by the appliance microprocessor and the device microprocessor each perform the step of:

downloading one or more of the one or more of the digital content filtering rule from the one or more of the remote data processing resource or the one or more AI information system.

7. The personal awareness system in accordance with claim 1, the appliance memory and the device memory are encoded with instructions that when executed by the appliance microprocessor and the device microprocessor each perform the steps of:

verifying a subscription fee has been paid for use of at least some of the one or more of the digital content filtering rule; and downloading, upon payment verification, the one or more of the one or more of the digital content filtering rule from the one or more of the remote data processing resource or the one or more AI information system.

8. The personal awareness system in accordance with claim 1, at least one of the one or more of the digital content filtering rule is a heuristic rule.

9. The personal awareness system in accordance with claim 1, at least one of the one or more of the digital content filtering rule is a machined learned or an AI information system generated rule.

10. The personal awareness system in accordance with claim 1, the plurality of data includes website digital content, audio content, video content, video streaming content, or text messages.

11. The personal awareness system in accordance with claim 1, the alert notification is either an activity report or a push notification delivered to the observer by way of the one or more of the monitor computing device.

12. The personal awareness system in accordance with claim 1, the device memory is encoded with instructions that when executed by the device microprocessor performs the step of:
receiving, from the one or more of the remote data processing resource or the one or more AI information system, at the mobile computing device the alert notification when one or more of the alarm condition occurs based, in part, on the plurality of sensor data, wherein the user is notified when personal safety of the user is at risk.

13. A method of using a personal awareness system for personal safety and digital content safety of a user, the method comprising the steps of:
providing a user with digital content safety by way of a network protection appliance comprising an appliance microprocessor, an appliance memory, and one or more of an appliance communication interface, the appliance memory, and the one or more of the appliance communication interface are operationally related to the appliance microprocessor, the network protection appliance is operationally related to a local area network, one or more of a monitor computing device by way of a monitor communication interface, wherein the network protection appliance by way of the appliance communication interface, a mobile computing device by way of a device communication interface, and one or more of a remote data processing resource data communicate with each other over a global communication network;
the appliance memory is encoded with instructions that when executed by the appliance microprocessor performs the steps of:
receiving, from the one or more of the remote data processing resource, at the one or more of the appliance communication interface, a plurality of data intended for one or more of a destination computing device usable by the user or the mobile computing device, the mobile computing device comprising a device microprocessor, a device memory, one or more of a sensor, and the device communication interface, the device memory, the one or more of the sensor, and the device communication interface are operationally related to the device microprocessor, the mobile computing device is used by the user;
querying one or more artificial intelligence (AI) information system to determine a data block condition, wherein the one or more AI information system interrogates the plurality of data in view of one or more of a digital content filtering rule;
communicating the plurality of data to the one or more of the destination computing device usable by the user or the mobile computing device when the data block condition is false and blocking the plurality of data from reaching the one or more of the destination computing device usable by the user or the mobile computing device when the data block condition is true;
providing the user with personal safety by way of the device memory being encoded with instructions that when executed by the device microprocessor performs the steps of:
collecting a plurality of sensor data from one or more of a sensor associated with the mobile computing device; and
communicating the plurality of sensor data to the one or more AI information system, the one or more of the remote data processing resource, or the one or more of the monitor computing device for use by one or more of an observer, the one or more of the monitor computing device comprising a monitor microprocessor, a monitor memory, and the monitor communication interface, the monitor memory and the monitor communication interface are operationally related to the monitor microprocessor, the monitor memory is encoded with instructions that when executed by the monitor microprocessor performs the step:
receiving at the one or more of the monitor computing device the alert notification, wherein personal safety of the user is monitored by the one or more of the observer by way of the one or more of the monitor computing device;
providing the user with digital content safety by transitioning between:
when the device communication interface has data communication access with the network protection appliance on the local area network:
receiving when the data block condition is false, at the mobile computing device, the plurality of data associated from the one or more of the appliance communication interface;
or, when the device communication interface is absent data communication access with the network protection appliance on the local area network:
receiving, in a mobile network environment, the plurality of data intended for the mobile computing device, by way of the device communication interface, from one or more of the one or more of the remote data processing resource;
querying the one or more AI information system to determine the data block condition, wherein the one or more AI information system interrogates the plurality of data in view of one or more of the digital content filtering rule; and
allowing the plurality of data to be operated on by the mobile computing device when the data block condition is false and blocking the plurality of data from being operated on by the mobile computing device when the data block condition is true;
wherein the personal awareness system protects personal safety of the user by monitoring mobile computing device sensor activity and protects online digital safety of the user by filtering digital content accessible to the user using the one or more of the digital content filtering rule by way of the network protection appliance in the local area network environment and by way of software encoded and executed on the mobile computing device in the mobile network environment.

14. The method of using a personal awareness system in accordance with claim 13, the monitor memory is encoded with instructions that when executed by the monitor microprocessor performs the step of:

receiving from the one or more of the remote data processing resource or the one or more AI information system, at one or more of the one or more of the monitor computing device, the alert notification when one or more of the alarm condition occurs based, in part, on the at least one of the data attribute.

15. The method of using a personal awareness system in accordance with claim 13, the device memory is encoded with instructions that when executed by the device microprocessor performs the steps of:

receiving an audio message by way of a microphone, the microphone is operationally related to the device microprocessor;

querying the AI information system to perform analysis of the audio message to determine a threat detection; and generating when the threat detection is detected, the alert notification at the mobile computing device or receiving the alert notification from the one or more of the remote data processing resource at the mobile computing device or the one or more of the monitor computing device.

16. The method of using a personal awareness system in accordance with claim 13, the device memory is encoded with instructions that when executed by the device microprocessor performs the steps of:

receiving a plurality of global position data from a global positioning system, the global positioning system is operationally related to the device microprocessor;

querying from the one or more AI information system a geo-fenced boundary based, in part, on the plurality of global position data;

determining if the plurality of global position data, representing physical location of the mobile computing device is outside of the geo-fenced boundary; and generating the alert notification at the mobile computing device or receiving the alert notification from the one or more of the remote data processing resource or the one or more AI information system at the mobile computing device or at the one or more of the monitor computing device when the mobile computing device is outside the geo-fenced boundary.

17. The method of using a personal awareness system in accordance with claim 13, the appliance memory and the device memory are encoded with instructions that when executed by the appliance microprocessor and the device microprocessor each perform the following step of:

downloading one or more of the one or more of the digital content filtering rule from the one or more of the remote data processing resource or the one or more AI information system.

18. The method of using a personal awareness system in accordance with claim 13, the appliance memory and the device memory are encoded with instructions that when executed by the appliance microprocessor and the device microprocessor each perform the steps of:

verifying a subscription fee has been paid for use of at least some of the one or more of the digital content filtering rule; and downloading, upon payment verification, the one or more of the one or more of the digital content filtering rule from the one or more of the remote data processing resource or the one or more AI information system.

19. The method of using a personal awareness system in accordance with claim 13, the device memory is encoded with instructions that when executed by the device microprocessor performs the step of:

receiving, from the one or more of the remote data processing resource or the one or more AI information system, at the mobile computing device, the alert notification when one or more of the alarm condition occurs based, in part, on the plurality of sensor data, wherein the user is notified when personal safety of the user is at risk.

20. A personal awareness system used for personal safety and digital content safety of a user comprising:

a mobile computing device comprising a device microprocessor, a device memory, one or more of a sensor, and a device communication interface, the device memory, the one or more of the sensor, and the device communication interface are operationally related to the device microprocessor, the mobile computing device is used by a user;

a network protection appliance comprising an appliance microprocessor, an appliance memory, and one or more of an appliance communication interface, the appliance memory, and the one or more of the appliance communication interface are operationally related to the appliance microprocessor, wherein the network protection appliance is operationally related to a local area network, the network protection appliance by way of the one or more of the appliance communication interface, the mobile computing device by way of the device communication interface, and one or more of a remote data processing resource data communicate over a global communication network;

the appliance memory is encoded with instructions that when executed by the appliance microprocessor performs the steps of:

providing the user with digital content safety by:

receiving, from the one or more of the remote data processing resource, at the one or more of the appliance communication interface, a plurality of data intended for one or more of a destination computing device usable by the user or the mobile computing device;

querying one or more artificial intelligence (AI) information system to determine a data block condition, wherein the one or more AI information system interrogates the plurality of data in view of one or more of a digital content filtering rule; and communicating the plurality of data to the one or more of the destination computing device usable by the user or the mobile computing device when the data block condition is false and blocking the plurality of data from reaching the one or more of the destination computing device usable by the user or the mobile computing device when the data block condition is true;

the device memory is encoded with instructions that when executed by the device microprocessor performs the steps of:

providing the user with personal safety by:

collecting a plurality of sensor data from the one or more of the sensor associated with the mobile computing device;

querying the one or more AI information system to determine an alert notification based, in part, on the plurality of sensor data;

providing the user with digital content safety by transitioning between:

when the device communication interface has data communication access with the network protection appliance on the local area network:
  receiving when the data block condition is false, at the mobile computing device, the plurality of data associated from the one or more of the appliance communication interface;
or, when the device communication interface is absent data communication access with the network protection appliance on the local area network:
  receiving, in a mobile network environment, the plurality of data intended for the mobile computing device, by way of the device communication interface, from one or more of the one or more of the remote data processing resource;
  querying one or more artificial intelligence (AI) information system to determine a data block condition, wherein the one or more AI information system interrogates the plurality of data in view of one or more of the digital content filtering rule; and
  allowing the plurality of data to be operated on by the mobile computing device when the data block condition is false and blocking the plurality of data from being operated on by the mobile computing device when the data block condition is true;
wherein the personal awareness system protects personal safety of the user by monitoring mobile computing device sensor activity and protects online digital safety of the user by filtering digital content accessible to the user using the one or more of the digital content filtering rule by way of the network protection appliance in the local area network environment and by way of software encoded and executed on the mobile computing device in the mobile network environment.

* * * * *